(12) United States Patent
Minemura et al.

(10) Patent No.: US 12,510,459 B2
(45) Date of Patent: Dec. 30, 2025

(54) PARTICLE MEASUREMENT DEVICE, PARTICLE MEASUREMENT METHOD, SAMPLE CONTAINER

(71) Applicant: Hitachi High-Tech Corporation, Tokyo (JP)

(72) Inventors: Hiroyuki Minemura, Tokyo (JP); Yumiko Anzai, Tokyo (JP); Kentaro Osawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 98 days.

(21) Appl. No.: 18/694,265

(22) PCT Filed: Jan. 24, 2022

(86) PCT No.: PCT/JP2022/002363
§ 371 (c)(1),
(2) Date: Mar. 21, 2024

(87) PCT Pub. No.: WO2023/139777
PCT Pub. Date: Jul. 27, 2023

(65) Prior Publication Data
US 2024/0402064 A1 Dec. 5, 2024

(51) Int. Cl.
G01N 15/14 (2024.01)
G01N 15/1429 (2024.01)
G01N 15/1434 (2024.01)

(52) U.S. Cl.
CPC ..... *G01N 15/1429* (2013.01); *G01N 15/1434* (2013.01); *G01N 2015/1493* (2013.01)

(58) Field of Classification Search
CPC .... G01N 15/10; G01N 15/14; G01N 15/1429; G01N 15/1434; G01N 15/1436; G01N 2015/1029; G01N 2015/1439
See application file for complete search history.

(56) References Cited

U.S. PATENT DOCUMENTS 5,422,714 A 6/1995 Fladd
2015/0062589 A1 3/2015 Osawa et al.
(Continued)

FOREIGN PATENT DOCUMENTS

JP 7-55700 A 3/1995
JP 2015-49204 A 3/2015
(Continued)

OTHER PUBLICATIONS

International Search Report (PCT/ISA/210) issued in PCT Application No. PCT/JP2022/002363 dated Mar. 29, 2022 with English translation (10 pages).
(Continued)

*Primary Examiner* — Kevin K Pyo
(74) *Attorney, Agent, or Firm* — Crowell & Moring LLP

(57) ABSTRACT

An object of the invention is to improve measurement accuracy depending on a refractive index while reducing a burden of a user inputting a refractive index of a particle or a refractive index of a solvent to a measurement device in a case of measuring a size or density of the particle by light irradiation. A particle measurement device according to the invention specifies a boundary position between a light transmitting window and a sample along an optical axis direction, and calculates a refractive index of the sample using a refractive index of a known sample at the boundary position and a refractive index of the light transmitting window (see FIG. 6).

15 Claims, 22 Drawing Sheets

(56) References Cited

U.S. PATENT DOCUMENTS

2017/0160185 A1    6/2017  Minemura et al.
2021/0050737 A1*   2/2021  Barton .................. H02J 7/0048
2022/0065766 A1*   3/2022  Anzai ................ G01N 15/0227

FOREIGN PATENT DOCUMENTS

JP       2017-102032 A     6/2017
WO    WO 2020/144754 A1    7/2020

OTHER PUBLICATIONS

Japanese-language Written Opinion (PCT/ISA/237) issued in PCT Application No. PCT/JP2022/002363 dated Mar. 29, 2022 with English translation (10 pages).
ANSI/SLAS Microplate Standards, URL: https://www.slas.org/education/ansi-slas-microplate-standards (acquired on Jan. 18, 2022) (2 pages).

* cited by examiner

| Inner diameter (mm) | Success rate |
|---|---|
| 2 | 80% |
| 2.5 | 86% |
| 3 | 100% |

| Inner diameter (mm) | Number of narrowed portions | | | | |
|---|---|---|---|---|---|
| | 0 | 1 | 2 | 3 | 4 |
| 2 | 0% | 28% | 82% | 90% | 84% |
| 2.5 | 46% | 50% | 90% | 100% | 96% |
| 3 | 50% | 54% | 94% | 100% | 100% |
| 3.5 | 58% | 82% | 100% | 100% | 100% |
| 4.0 | 60% | 94% | 100% | 100% | 100% |
| 4.5 | NG (liquid level insufficient) | | | | |

PARTICLE MEASUREMENT DEVICE, PARTICLE MEASUREMENT METHOD, SAMPLE CONTAINER

TECHNICAL FIELD

The present invention relates to a technique for measuring a size distribution of a particle floating in a sample containing a solvent and the particle.

BACKGROUND ART

In recent years, the focus of drug development has been shifting from small molecule drugs to biopharmaceuticals. Since biopharmaceuticals are polymers, they tend to aggregate, and aggregation can cause toxicity. For example, the food and drug administration or the like is trying to tighten regulations for controlling a concentration of aggregates. Therefore, there is a need for a technique to quantitatively measure size distribution of a desired density for aggregates in a submicron region of 0.1 µm to 1 µm. Protein aggregates float in a solvent, and positions thereof change over time due to Brownian motion. In the invention, a technique for measuring a size and density of a standard particle such as a protein aggregate and a polystyrene bead will be described below. These objects are collectively referred to as a "particle".

PTL 1 describes a technique for detecting a particle using an optical measurement. PTL 1 describes "An optical measurement method for converging light to generate a light spot and measuring an object having a size equal to or smaller than about three times a size of the light spot, the method including: a signal acquisition step of detecting reflected light reflected from the object by irradiating the object while moving a focal position of the light in an optical axis direction at least; a step of acquiring correspondence relationship data in which a correspondence relationship between an intensity of the reflected light and a size of the object is described; and a size calculation step of acquiring the size of the object by referring to the correspondence relationship data using the intensity of the reflected light." (claim 1). The technique described in PTL 1 can implement a high-resolution measurement without the need for preprocessing by signal enhancement through interference of reflected light and reference light.

PTL 2 discloses a technique in which, by physically scanning an objective lens and receiving interference between signal light and interference light using four detectors with different phase conditions, it is unnecessary to adjust a phase of reference light by mirror scanning in time domain optical coherence tomography (OCT). Further, PTL 2 discloses a technique for speeding up scanning of a light spot based on the technique in PTL 1 so as not to be affected by a movement of a particle undergoing Brownian motion in a liquid.

PTL 3 discloses a technique in which, in a measurement of a biological tomographic image using a semiconductor laser as a light source, a coherence length is controlled within a predetermined range by superimposing a radio frequency on a drive current, thereby reducing an influence of noise contained in the acquired tomographic image.

PTL 4 discloses a technique for measuring a refractive index of a solvent using a special container and an optical system.

NPL 1 discloses standard information on a function and shape of a typical microplate as a container used for analysis of biopharmaceuticals. The standard will be referred to in an embodiment of a sample container to be described later.

CITATION LIST

Patent Literature

PTL 1: JP2017-102032A
PTL 2: WO2020/144754
PTL 3: JP2015-049204A
PTL 4: JPH7-055700A

Non Patent Literature

NPL 1: URL: https://www.slas.org/education/ansi-slas-microplate-standards/(acquired on Jan. 18, 2022)

SUMMARY OF INVENTION

Technical Problem

It is considered that the size and density of the particle such as a protein aggregate are measured using the technique described in PTL 1 or 2. The reflected light detected using the technique described in PTL 1 or 2 changes depending on a size of a particle and a refractive index thereof. In the technique described in PTL 1 or 2, a detection signal can be obtained by converting an electric field amplitude of reflected light into a voltage using interference of light. A magnitude of the detection signal changes depending on not only the size of the particle but also the refractive index of the particle and a refractive index of a solvent. On the other hand, in a biopharmaceutical, for example, pH, a salt, a sugar, a surfactant, or the like is added in an appropriate amount such that a protein does not aggregate as much as possible. Therefore, the refractive index of the solvent changes depending on additive conditions.

In a case of a protein aggregate having a small refractive index difference with a solvent, a magnitude of a detection signal changes significantly with respect to a change in the refractive index of the solvent. Accordingly, when measuring the size and density of the protein aggregate using the technique described in PTL 1 or PTL 2, a user needs to input refractive indices of the protein aggregate and the solvent to a measurement device with high accuracy.

Instead of the user inputting the refractive indices, a device for measuring a refractive index as disclosed in PTL 4 may be used. However, in a commercially available refractive index measurement device including a method described in PTL 4, a wavelength of a light source to be used often takes a discrete value. Therefore, from the viewpoint of user convenience, it is difficult to accurately obtain refractive indices of the solvent and the particle, respectively, depending on a difference in wavelength and a difference in additive conditions.

The invention has been made to solve the above problem, and an object of the invention is to improve measurement accuracy depending on a refractive index while reducing a burden of a user inputting a refractive index of a particle or a refractive index of a solvent to a measurement device in a case of measuring a size or density of the particle by light irradiation.

Solution to Problem

A particle measurement device according to the invention specifies a boundary position between a light transmitting window and a sample along an optical axis direction, and calculates a refractive index of the sample using a refractive index of a known sample at the boundary position and a refractive index of the light transmitting window.

Advantageous Effects of Invention

According to the invention, convenience and measurement accuracy in measuring a size and density of a particle in a medium using light can be improved. Problems, configurations, effects, and the like other than those described above will become apparent in the following description of embodiments.

DESCRIPTION OF EMBODIMENTS

Embodiment 1: Problem of Technique in Related Art

Figure 1:
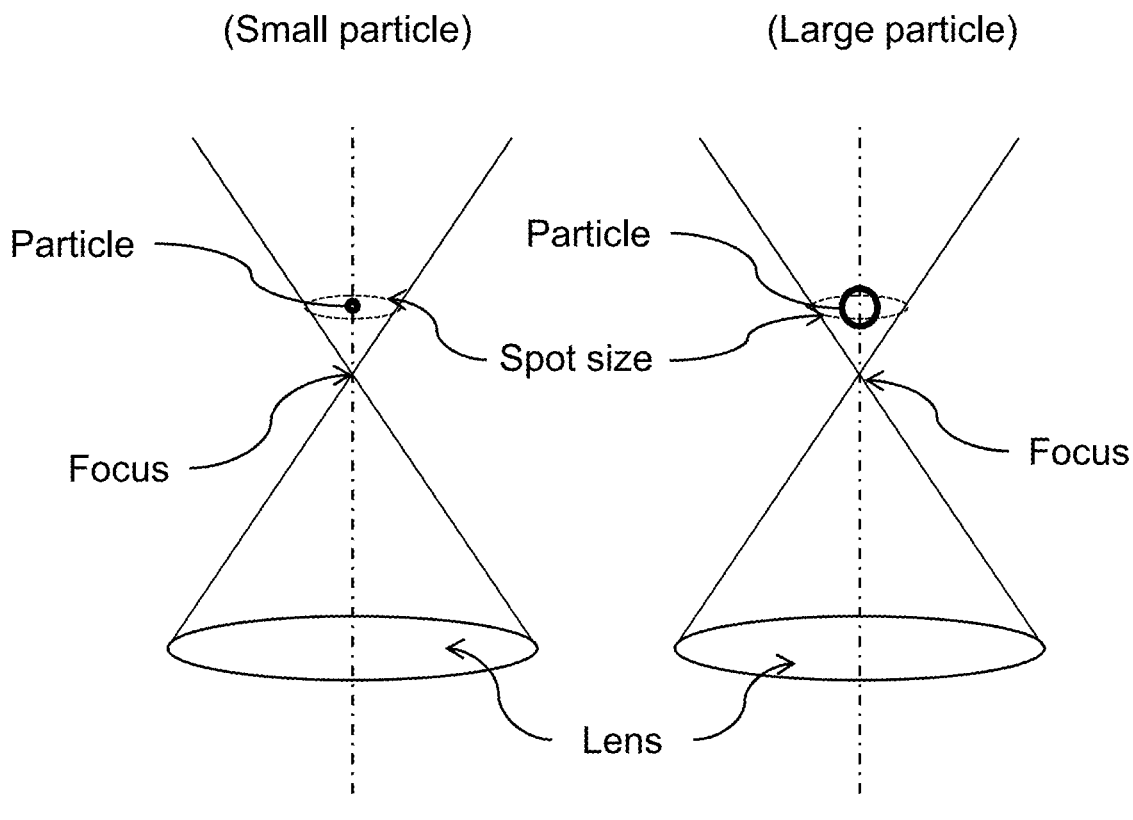
FIG. 1 is a schematic diagram showing a relationship between a defocus and a detection signal and a particle size in a technique described in PTL 1.
Figure 1:
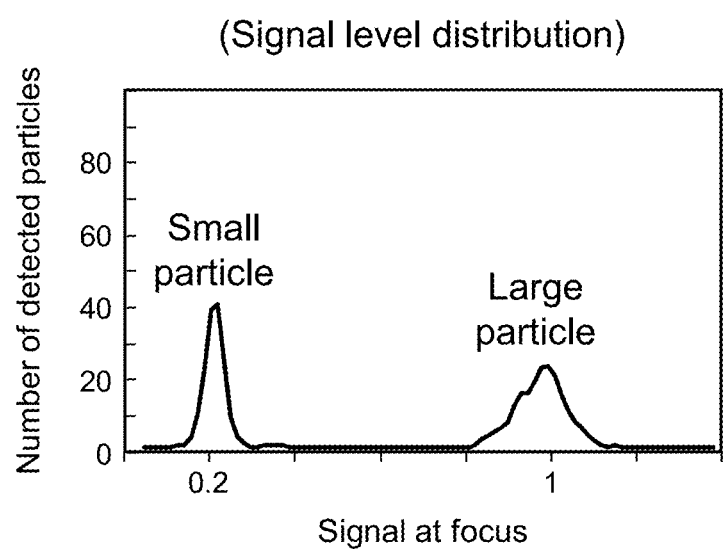

FIG. 1 is a schematic diagram showing a relationship between a defocus and a detection signal and a particle size in a technique described in PTL 1. An upper left part in FIG. 1 geometrically shows an optical system in a case of defocusing for a relatively small particle. A geometric spot size of the particle at a z position (a coordinate along an optical axis) is geometrically determined by a numerical aperture of an objective lens and a defocus amount. A detection signal is attenuated depending on a ratio of a projected area of the particle within an area of a geometric beam. The ratio of the projected area corresponds to a reaction cross-sectional area of light reflection. An upper right part in FIG. 1 is a schematic diagram showing a case of defocusing for a relatively large particle. As compared with the upper left part in FIG. 1, a reaction cross-sectional area is large due to a large particle size, and an amount of reflected light is also large. Therefore, a difference in particle size can be detected as a difference in reflected light amount (a difference in detection signal amount). A lower part in FIG. 1 is an experimental result showing a relationship between a detection signal amount at a focal position and a particle size.

Figure 2:
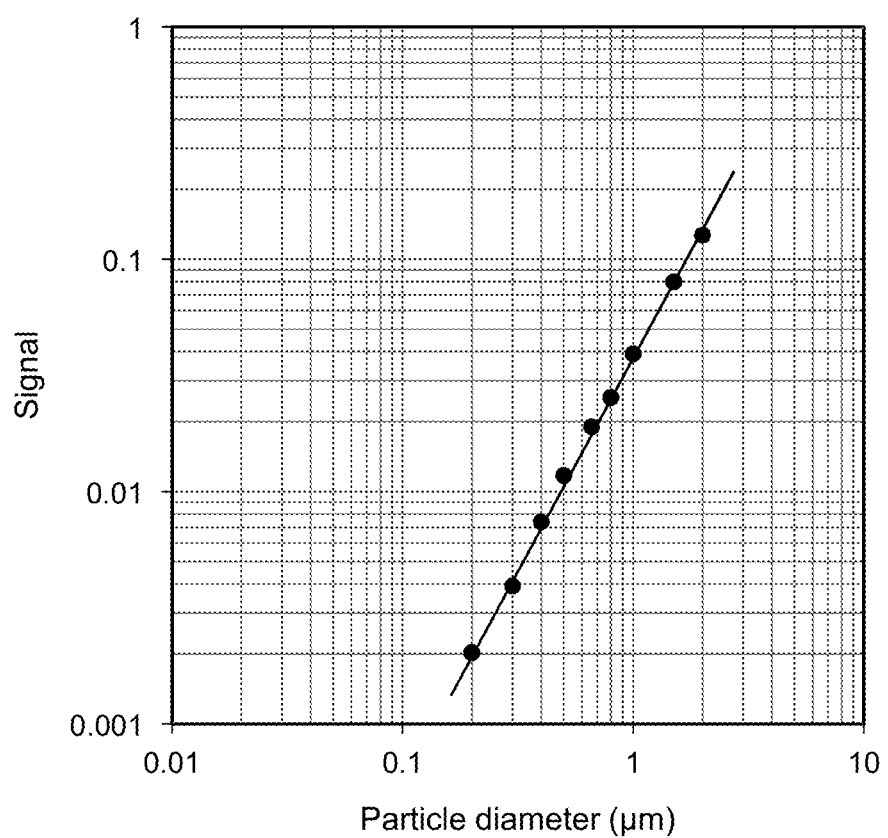
FIG. 2 is a simulation result showing a relationship between a particle diameter and a signal intensity.

FIG. 2 is a simulation result showing a relationship between a particle diameter and a signal intensity. As a simulation method, a "wave-like ray tracing method" described in PTL 1 is used, a wavelength of a light source is 785 nm, and a numerical aperture of an objective lens is 0.45. As seen in FIG. 2, a magnitude of the detection signal changes depending on a magnitude of the particle. By storing the correspondence relationship data in advance, the particle size can be measured from the magnitude of the detection signal.

On the other hand, detected reflected light changes depending on the particle size and also changes depending on a refractive index of the particle. In techniques described in PTL 1 and PTL 2, a detection signal can be obtained by converting an electric field amplitude of reflected light into a voltage using interference of light. At this time, a magnitude $|E_{sig}|$ of the detection signal can be expressed by the following formula when a coherence length of a light source is sufficiently long based on the Fresnel's law using a refractive index $n_p$ of the particle and a refractive index $n_m$ of the solvent. S is an electric field amplitude of light with which a sample is irradiated, R is an electric field amplitude of a reference light, σ is a coefficient that changes depending on a particle size, and η is a constant indicating interference efficiency of reflected light and reference light and efficiency of high electric power conversion of an optical detector.

[Math. 1]

$$|E_{sig}| = \eta\sigma|S||R|\frac{|n_p - n_m|}{|n_p + n_m|} \quad \text{(FORMULA 1)}$$

As seen in Formula 1, the magnitude of the detection signal changes depending on not only the particle size but also the refractive index $n_p$ of the particle and the refractive index $n_m$ of the solvent. On the other hand, in a biopharmaceutical, for example, pH, a salt, a sugar, a surfactant, or the like is added in an appropriate amount such that a protein does not aggregate as much as possible. Therefore, the refractive index of the solvent changes depending on additive conditions.

Figure 3:
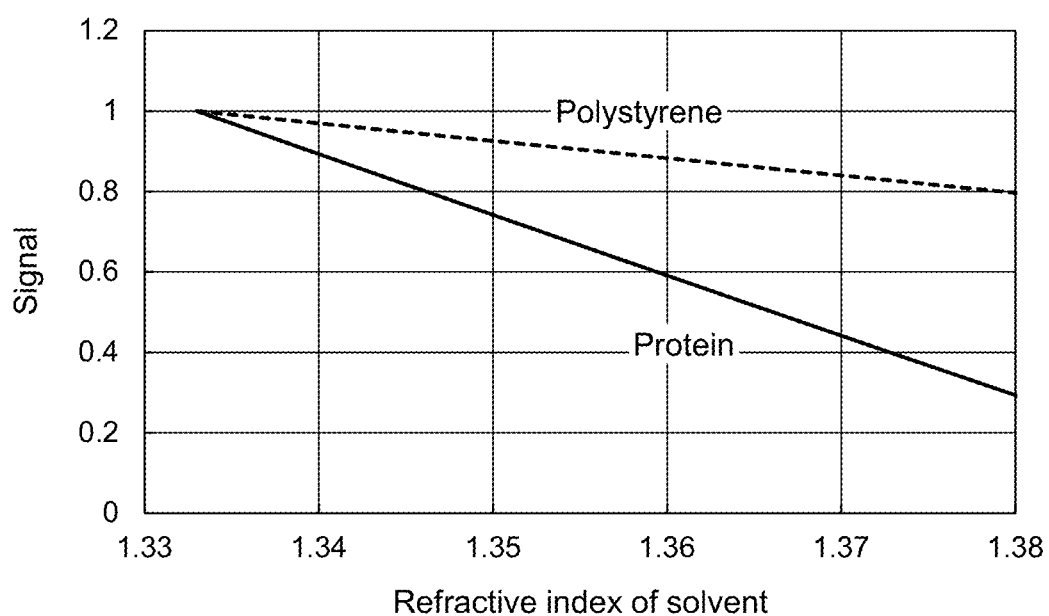
FIG. 3 is a calculation result showing a relationship between a refractive index of a solvent and a magnitude of the detection signal, which is calculated based on Formula 1.

FIG. 3 is a calculation result showing a relationship between the refractive index of the solvent and the magnitude of the detection signal, which is calculated based on Formula 1. Here, a refractive index of polystyrene was 1.58, and a refractive index of a protein aggregate was 1.40. As seen in FIG. 3, in a case of a protein aggregate having a small refractive index difference with the solvent, a change in magnitude of the detection signal is large with respect to a change in refractive index of the solvent.

Due to such a relationship, when measuring a size and density of a protein aggregate using the techniques described in PTL 1 and PTL 2, a user needs to input refractive indices of the protein aggregate and a solvent to a measurement device with high accuracy. The input may be a burden on the user during a measurement. In Embodiment 1 of the invention, a method for reducing the burden on the user due to such input of the refractive index will be described.

In the following description, as shown in FIG. 1, a description will be based on a coordinate system in which an optical axis direction is a z-axis. A size of a particle to be measured is treated as a diameter of a sphere having the same volume.

Figure 4:
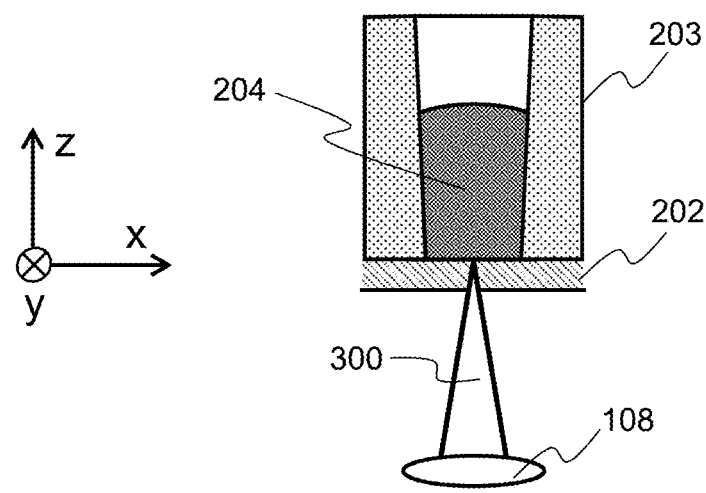
FIG. 4 is a schematic diagram showing a relationship between a container containing a solvent containing a particle to be measured and laser light for measurement.

Embodiment 1: Regarding Method for Measuring Refractive Indices of Solvent and Target Particle FIG. 4 is a schematic diagram showing a relationship between a container containing a solvent containing a particle to be measured and laser light for measurement. In FIG. 4, a reference numeral 108 denotes an objective lens, a reference numeral 300 denotes laser light, a reference numeral 204 denotes a sample, a reference numeral 203 denotes a container, and a reference numeral 202 denotes a transparent window provided on a bottom surface of the container. In the present embodiment, in order to measure a refractive index of a solvent, a fact that a reflectance at a boundary between the solvent and the transparent window 202 depends on the refractive index of the solvent is utilized. A focus of the objective lens 108 can be positioned at a boundary between the sample 204 and the transparent window 202 by determining a condition where a detection signal is maximum while moving a sample stage (not shown) in a Z direction. At this time, the magnitude $E_{sig}$ of the detection signal is expressed by the following formula based on the Fresnel formula using the refractive index $n_m$ of the solvent and the refractive index ng of the transparent window. S is an electric field amplitude of light with which a sample is irradiated, R is an electric field amplitude of a reference light (not shown), and n is a constant indicating interference efficiency of reflected light and reference light and efficiency of high electric power conversion of an optical detector.

[Math. 2]

$$|E_{sig}| = \eta|S||R|\frac{|n_g - n_m|}{|n_g + n_m|} \quad \text{(FORMULA 2)}$$

In the present embodiment, by selecting a material of the transparent window 202, a refractive index thereof can be used as a prescribed value. Similarly, the electric field amplitude S of light emitted to the sample 204 and the electric field amplitude R of reference light can be handled as constant values by setting an emission power condition of a semiconductor laser (not shown) to be constant. Further, a magnitude of a detection signal when a liquid having a known refractive index no, such as pure water for a clean room, is used as a sample is measured in advance, and the measured value is defined as $|E0_{sig}|$. $|E0_{sig}|$ is expressed by the following formula.

[Math. 3]

$$|E0_{sig}| = \eta |S||R|\frac{|n_g - n_o|}{|n_g + n_o|} \quad \text{(FORMULA 3)}$$

From Formula 2 and Formula 3, the following formula is established.

[Math. 4]

$$\frac{|E_{sig}|}{|E0_{sig}|} = \frac{|n_g - n_m|}{|n_g + n_o|} \quad \text{(FORMULA 4)}$$

In Formula 4, values other than the refractive index $n_m$ of a solvent are known values or measured values. Therefore, using Formula 4, the refractive index $n_m$ of a solvent can be directly quantified for a sample to be measured. At this time, since a wavelength of a light source is a measurement wavelength itself, there is no need for processing such as converting a value that changes depending on the wavelength into a value corresponding to the measurement wavelength as described above.

Figure 5A:
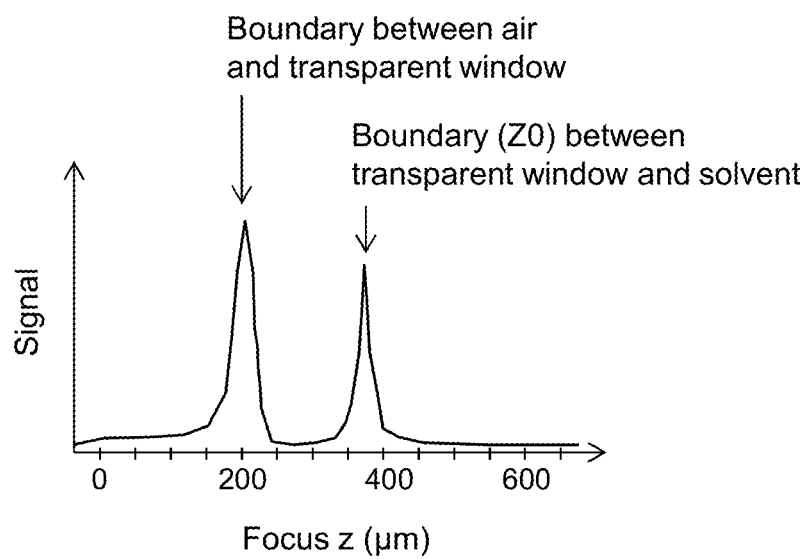
FIG. 5A is an experimental result showing a detection signal when a sample is moved in a Z direction and a focal position is changed.

FIG. 5A is an experimental result showing a detection signal when a sample is moved in the Z direction and a focal position is changed. A peak observed at a focal position of about 200 μm represents reflected light from an interface between the transparent window and the air, and a peak observed at a focal position of about 375 μm represents reflected light from an interface between the transparent window and the sample (the solvent). A distance between the peaks indicates a thickness of the transparent window. In this way, when a position of a second peak from the left in FIG. 5A is obtained by acquiring the detection signal while scanning the focal position to contain the interface between the transparent window and the air and the interface between the transparent window and the solvent, a focal position Z0 at a boundary between the transparent window and the solvent can be positioned.

Figure 5B:
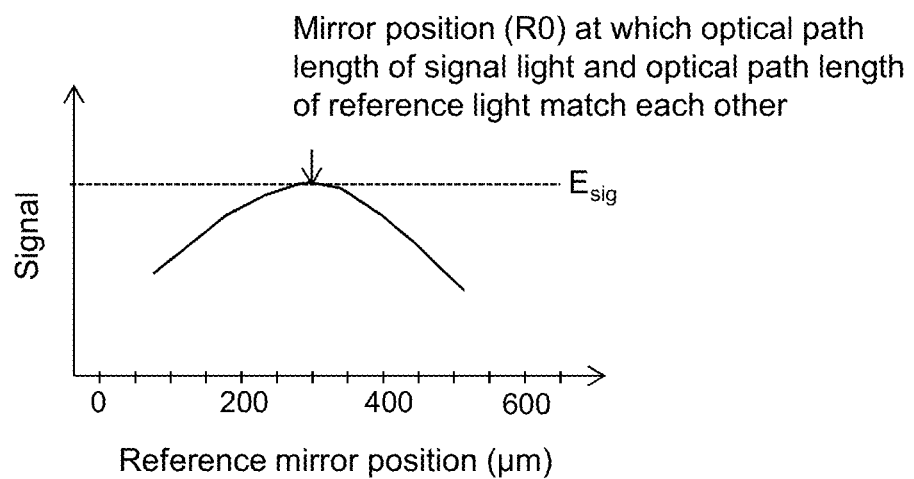
FIG. 5B is an experimental result showing a change in detection signal when the focal position is fixed at Z0 and a position of a reference light mirror is changed.

FIG. 5B is an experimental result showing a change in detection signal when the focal position is fixed at Z0 and a position of a reference light mirror is changed. As shown in FIG. 5B, when the reference light mirror is at a position of about 300 μm, an optical path length for the reflected light to reach a detector is equal to an optical path length for the reference light to reach the same detector, and the detection signal is maximum. A maximum value of the detection signal at this time is $E_{sig}$ in Formula 4. Although a description of the reference light is omitted, details of the optical system will be described later.

Figure 6:
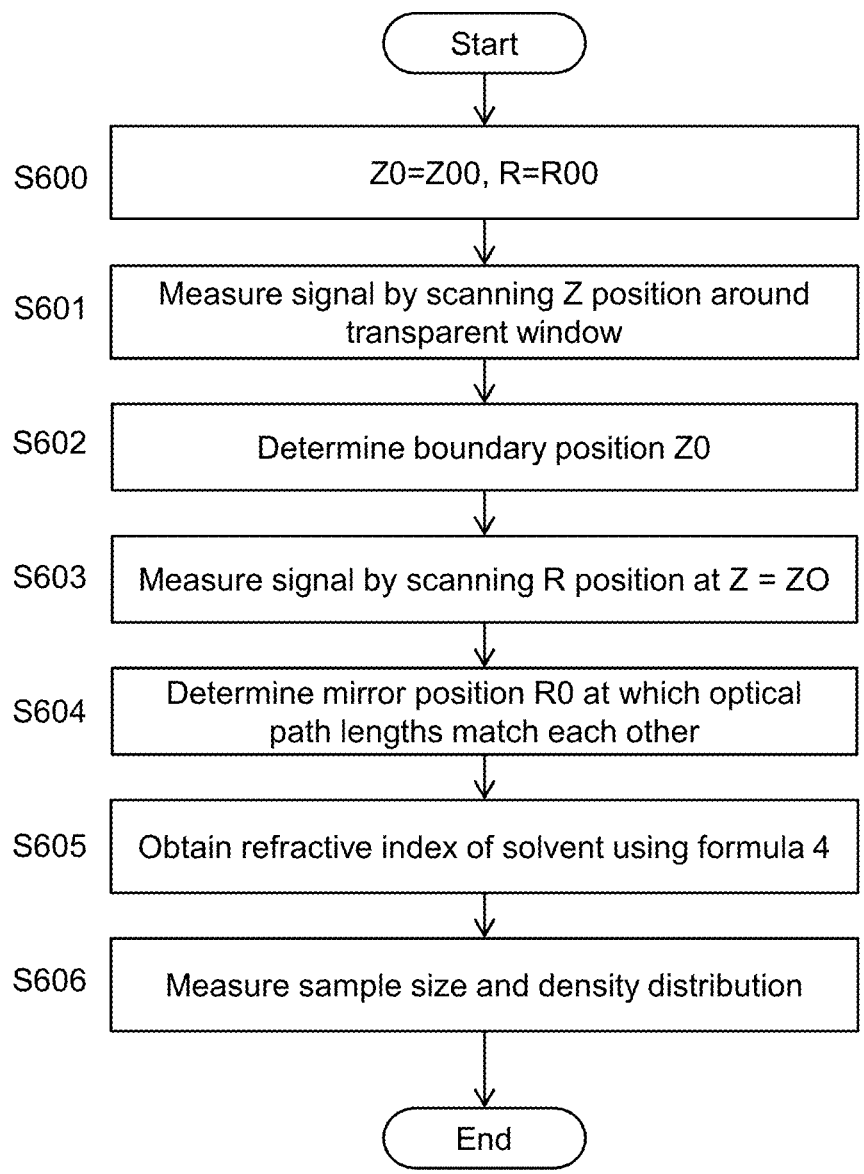
FIG. 6 is a flowchart showing a flow of a measurement in Embodiment 1.

FIG. 6 is a flowchart showing a flow of the measurement in the present embodiment. In step S600, the focal position Z0 and a reference light mirror position R0 are initialized to predetermined initial values Z00 and R00. In steps S601 and S602, a detection signal is acquired while scanning the focal position Z0, and Z0 is updated so as to focus on the boundary between the transparent window and the solvent. In steps S603 and S604, the reference light mirror position R0 at which the optical path length for the detection signal and the optical path length for the reference light match each other is updated. In step S605, the refractive index $n_m$ of the solvent is obtained using Formula 4. In step S606, the focal position is moved into the sample, and a size and density of the particle contained in the sample are measured using the refractive index $n_m$. For the measurement of the size and density of the particle, reflected light from the particle is converted into an electric signal as a detection signal for measurement while moving the focal position in X, Y, and Z directions within a predetermined range, a maximum value of the detection signal at the focal position is obtained for each particle, the size and density of each particle are measured using the refractive index $n_m$ of a medium, and the size and density are presented in a form that can be visually recognized by the user. At this time, in the conversion for obtaining the particle size from the maximum value of the detection signal, the relationship in FIG. 2 corrected according to the refractive index $n_m$ of the solvent is used.

Figure 7:
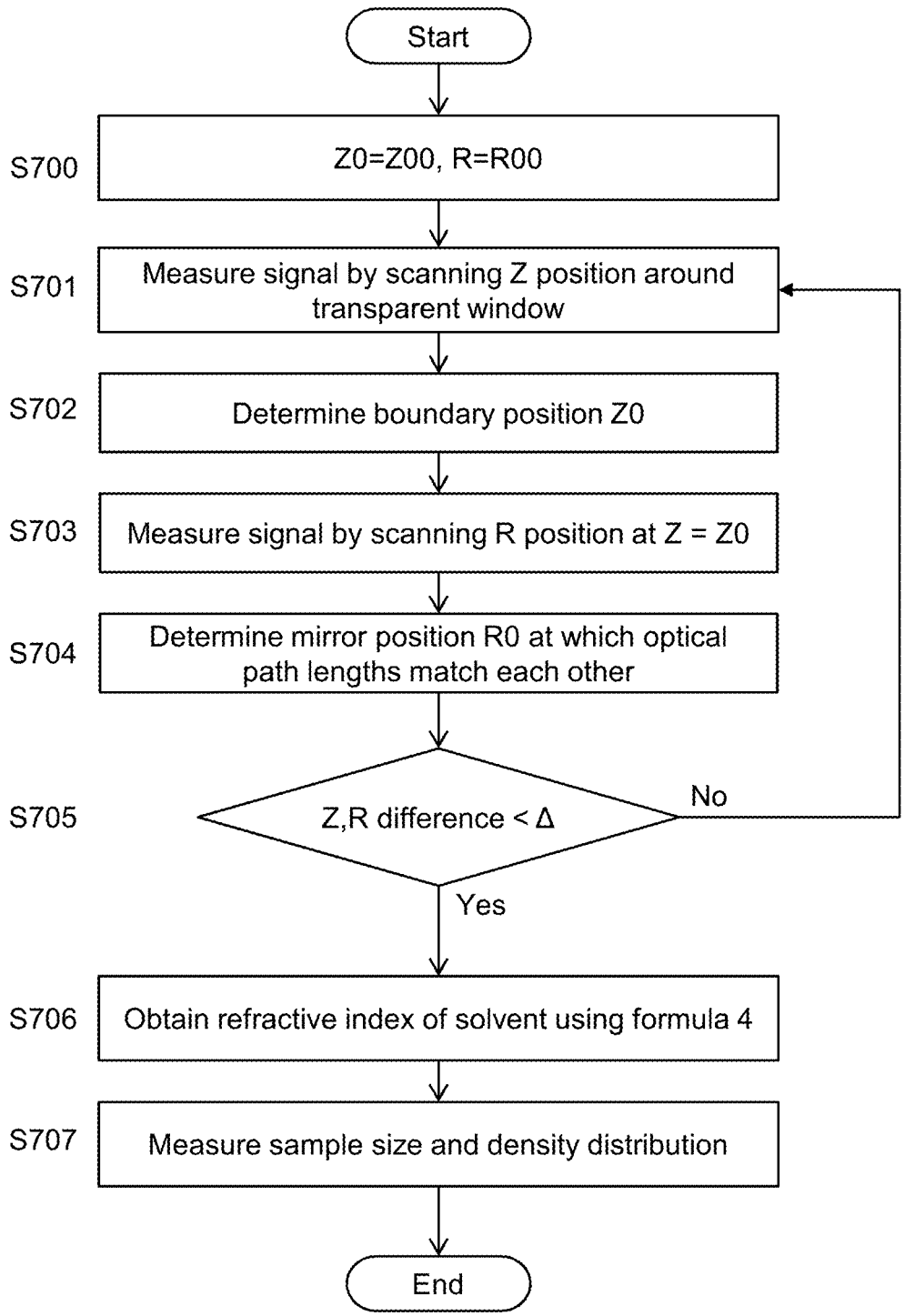
FIG. 7 is another flowchart showing the flow of the measurement in Embodiment 1.

FIG. 7 is another flowchart showing a flow of the measurement in the present embodiment. In the invention, a sample container can be of a disposable type in order to improve user convenience and size distribution measurement accuracy. At this time, a condition for focusing on the boundary between the transparent window and the solvent may deviate greatly from a predetermined initial value (for example, by about 10 μm or more) due to an individual difference in shape of the sample container or a positional deviation occurring when the user places the sample container into the device. FIG. 7 is a flowchart of the present embodiment suitable for such a case. The present embodiment can be implemented by repeating update of Z0 and R0 until changes of a spot position of laser light and a position of the reference light mirror from previous values become equal to or less than a predetermined threshold Δ.

In step S700, the focal position Z0 and the reference light mirror position R0 are initialized to the predetermined initial values Z00 and R00. Steps S701 to S704 are the same as steps S601 to S604. In step S705, it is determined whether both a difference between a current value and a previous value of Z0 and a difference between a current value and a previous value of R0 are smaller than the threshold Δ. When the condition is not satisfied, the previous values of Z0 and R0 are updated with the current values, respectively, and the processing returns to S701 to repeat the trial. When the condition in S705 is satisfied, steps S706 and S707 are performed. Steps S706 and S707 are the same as steps S605 and S606. The threshold Δ for Z0 and the threshold Δ for R0 may be the same value or different values.

Through experimental studies by the inventors, it has been found that when a semiconductor laser having a wavelength of 785 nm is used as the light source, a microscope lens having a numerical aperture of 0.45 is used as the objective lens, and borosilicate glass (measured refractive index value=1.520) having a thickness of 175 μm is used as the transparent window, the threshold Δ is suitably about 1 μm in the Z direction and about 5 μm in an R direction. For a movement range of the focal position in the size distribution measurement, it has been found that a range of about 50 μm to 100 μm in the Z direction and about 300 μm to 500 μm in the X and Y directions is suitable. In order to measure the size of the particle in response to a change in position of the particle undergoing random Brownian motion in the solvent, it is preferable to use a resonant galvanometer mirror widely used in a scanning laser microscope or the like for any one of the focus scans in the X or Y direction. The numerical values described here can be appropriately determined by an engineer familiar with a general interferometric measurement, depending on specifications of a wavelength, a beam diameter, and an objective lens.

Figure 8:
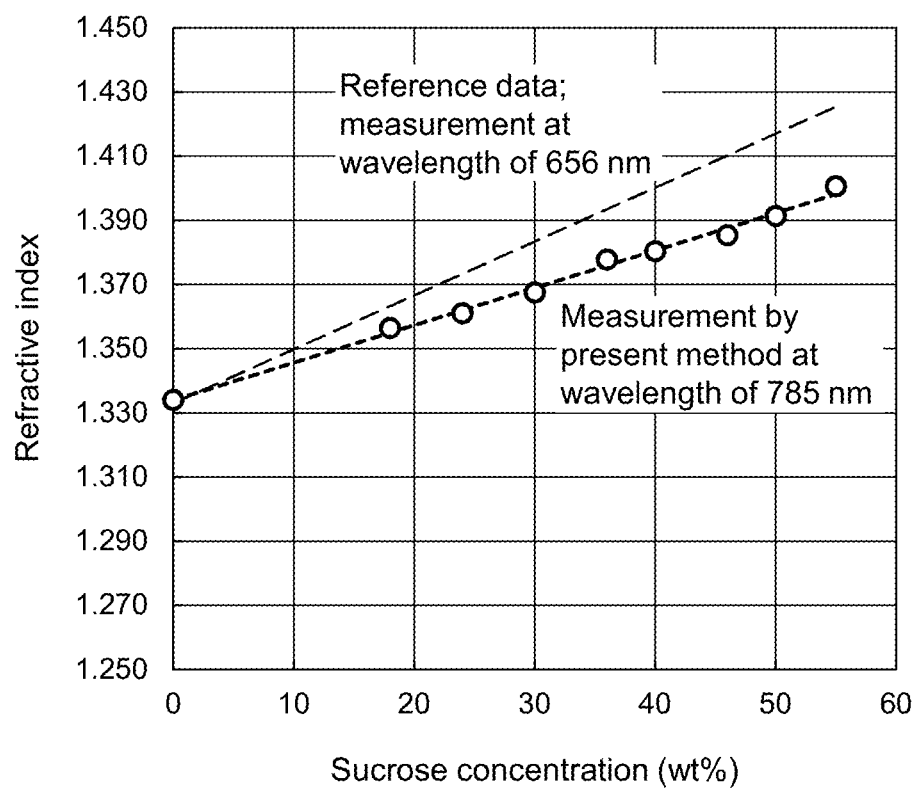
FIG. 8 is a measurement result of a refractive index of a solvent that is measured using an aqueous sucrose solution as a solvent.

FIG. 8 is a measurement result of a refractive index of a solvent that is measured using an aqueous sucrose solution as the solvent. As is well known, a refractive index of an aqueous sucrose solution changes linearly depending on a concentration. Reference data in FIG. 8 shows public data of the refractive index of the aqueous sucrose solution that is measured with a C-line (656.27 nm) using a Cal New Precision Refractometer (http://www.shimadzu.co.jp/products/opt/products/ref/ref-app05.html). As described above, since a general refractive index measurement method is performed on discrete wavelengths using parallel light, it is difficult to directly correspond to a wavelength when, for example, a semiconductor laser having a wavelength of 785 nm is used as the light source. Generally, it is known that a refractive index of a dielectric material tends to decrease as the wavelength increases, and it is also known that the refractive index depends on a temperature. The refractive index measured using the present embodiment is a refractive index for laser light converged by an objective lens using the light source for measuring the size distribution as it is, and a temperature condition of the sample is the same as that for performing the size measurement. Therefore, there is no need for the user to convert these factors and input the refractive index as described above, and convenience can be improved.

Embodiment 2: Regarding Movement Amount of Focal Position into Sample and Movement Amount of Reference Light Mirror In the invention, weak reflected light from a particle floating in a solvent is amplified and detected by a homodyne phase diversity method. Details of an optical system constituting the homodyne phase diversity method will be described later, and in order for this to implement a predetermined amplification, it is required that optical path lengths for reflected light and reference light match each other on an optical detector. In Embodiment 2 of the invention, a specific method for matching the optical path lengths will be described.

Figure 9A:
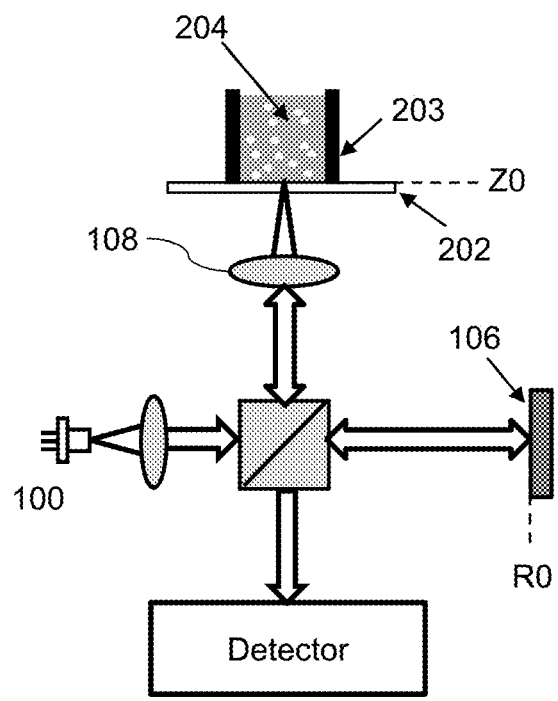
FIG. 9A is a schematic diagram showing an optical path when a focus of laser light is at a boundary between a transparent window and a solvent.

FIG. 9A is a schematic diagram showing an optical path when a focus of laser light is at a boundary between a transparent window and a solvent. A position of a sample held by a Z stage (not shown) is defined as Z0, and a position of a reference light mirror held by an R stage (not shown) is defined as R0. A part of light emitted from a semiconductor laser serving as a light source travels toward the sample as signal light, is reflected, and is guided to a detection optical system. At the same time, another part of the light emitted from the semiconductor laser travels toward the reference light mirror as reference light, is reflected, and is guided to the detection optical system. In Z0 and R0, optical path lengths for the signal light and the reference light from the semiconductor laser to the detection optical system match each other on a wavelength order.

Figure 9B:
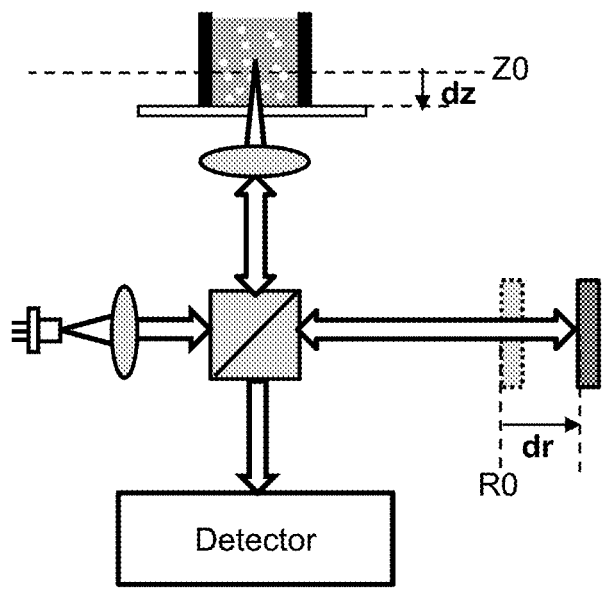
FIG. 9B is a schematic diagram showing a movement amount when the focus of the laser light is moved into a sample.

FIG. 9B is a schematic diagram showing a movement amount when the focus of the laser light is moved into the sample. As seen in FIG. 9B, in order to move the focus of the laser light into the sample, the Z stage holding the sample may be moved by dz and the R stage holding the reference light mirror may be moved by dr. Since a particle to be measured by the invention randomly performs Brownian motion in a medium, and positions thereof are not fixed, it is difficult to set the optical path lengths to match each other while scanning Z and R as described above. When provisionally performing the procedure, the measurement of the particle size distribution as described above is performed while the reference light mirror position is changed several tens of times at intervals of about 5 μm, and the reference light mirror position is determined under a condition where an average value of detection signals from a plurality of detected particles becomes maximum. However, in such a procedure, it takes extra time for the measurement, and the convenience of the user is greatly impaired. Therefore, in the present embodiment, a relationship between dz and dr is determined as follows from the optical viewpoint.

A change dFP in focal position when a sample position is moved by dz in an objective lens direction depends on the refractive index $n_m$ of the solvent, and can be approximated by the following formula according to the Snell's law or a paraxial theory in optics.

[Math. 5]
$$dFP = dz\, n_m \quad \text{(FORMULA 5)}$$

A change dL in optical path length until reflected light from the focus reaches the detection optical system can be expressed by the following formula, since an optical path length in the air decreases by dz and an optical path length in the medium increases by dFP.

[Math. 6]
$$dL = 2(n_m^2 - 1)dz \quad \text{(FORMULA 6)}$$

Therefore, the movement amount dr of the reference light mirror for matching the signal light and the optical path length can be expressed by the following formula, where a is a correction term of the above approximation.

[Math. 7]
$$dr = \alpha(n_m^2 - 1)dz \quad \text{(FORMULA 7)}$$

The correction term a is mainly affected by a change in spherical aberration of the objective lens, and can be obtained by a ray tracing method when a structure of the objective lens is known. Through experimental studies by the inventors, it has been found that when a semiconductor laser having a wavelength of 785 nm is used as the light source, and a microscope lens having a numerical aperture of 0.45 is used as the objective lens, and borosilicate glass (measured refractive index value=1.520) having a thickness of 175 μm is used as the transparent window, good correction can be performed with α=1.029 in a dz range of 100 μm to 900 μm. When changing the wavelength of the light source or the objective lens, a value of a may be appropriately determined by calculations based on ray tracing or experimental studies as described above. The value of a changes depending on selection of the optical system, and a range thereof is 0.8 to 1.2.

By using Formula 5 and Formula 7, a focus position with respect to the movement amount of the sample and the movement amount of the reference light mirror can be uniquely determined without exhaustive scanning of the reference light mirror position as described above, an increase in measurement time can be prevented, and securing of measurement accuracy and improvement of user convenience can be simultaneously implemented.

Here, although a relationship between the movement amount of the sample position in an objective lens direction and the movement amount of the reference light mirror is shown, it is also possible to move the objective lens while fixing the sample position. In this case, when the objective lens position is moved by the same dz in a sample direction, the movement amount dr of the reference light mirror can be determined by using the relationships of Formulae 5 to 7 as they are. A specific embodiment will be described later.

Next, a suitable value of the sample movement amount dz in the particle size distribution measurement of the invention will be described. In the invention, weak reflected light from a particle floating in the solvent is amplified by the homodyne phase diversity method and converted into an electric signal for detection. Considering an influence of the coherence length of the semiconductor laser serving as the light source on Formula 1, the magnitude $|E_{sig}|$ of the detection signal from the particle at the focus of the laser light is proportional to a magnitude of an electric field $E_s$ of the reflected light and a magnitude of an electric field $E_r$ of the reference light, and is expressed as follows, where L is a coherence length and ΔL is a difference between the optical path lengths for the signal light and the reference light.

[Math. 8]

$$|E_{sig}| = \eta\sigma|S||R|\frac{|n_p - n_m|}{|n_p + n_m|} \cdot \exp\left\{-2\text{Log}(2)\frac{\Delta L^2}{L^2}\right\} \quad \text{(FORMULA 8)}$$

The coherence length is an FWHM range of an optical path length difference in which a square $|E_{sig}|^2$ of the detection signal is ½ of the maximum value. The description of the other terms overlaps the description of Formula 1, and thus the description thereof is omitted here.

In the invention, reflected light from a target particle is detected by the homodyne phase diversity method, and similar to other optical measurement methods, the reflected light from the boundary between the transparent window and the solvent is also received by the detection optical system. The reflected light from the transparent window and the solvent is about 10 times to 100 times larger than the reflected light from the target particle, and acts as unnecessary noise during the particle size distribution measurement, and an influence thereof is discussed next.

When the focus of the laser light is within the sample, the reflected light from the boundary between the transparent window and the solvent is detected as reflected light from an out-of-focus surface with a defocus aberration. A magnitude $|E_{sig\_boundary}|$ of the detection signal detection signal in this case is expressed by the following formula.

[Math. 9]

$$|E_{sig\_boundary}| = \quad \text{(FORMULA 9)}$$

$$\eta|S||R|\frac{|n_g - n_m|}{|n_g + n_m|} \cdot \left|\text{sinc}\left(\pi \cdot \frac{Z}{\lambda} \cdot NA^2\right)\right| \cdot \exp\left\{-2\text{Log}(2)\frac{\Delta L^2}{L^2}\right\}$$

In Formula 9, an influence of the defocus aberration is a term of a sinc function, Z is a focal position (corresponding to a defocus amount) in the sample, λ represents a wavelength of the light source, and NA represents a numerical aperture of the objective lens.

Figure 10:
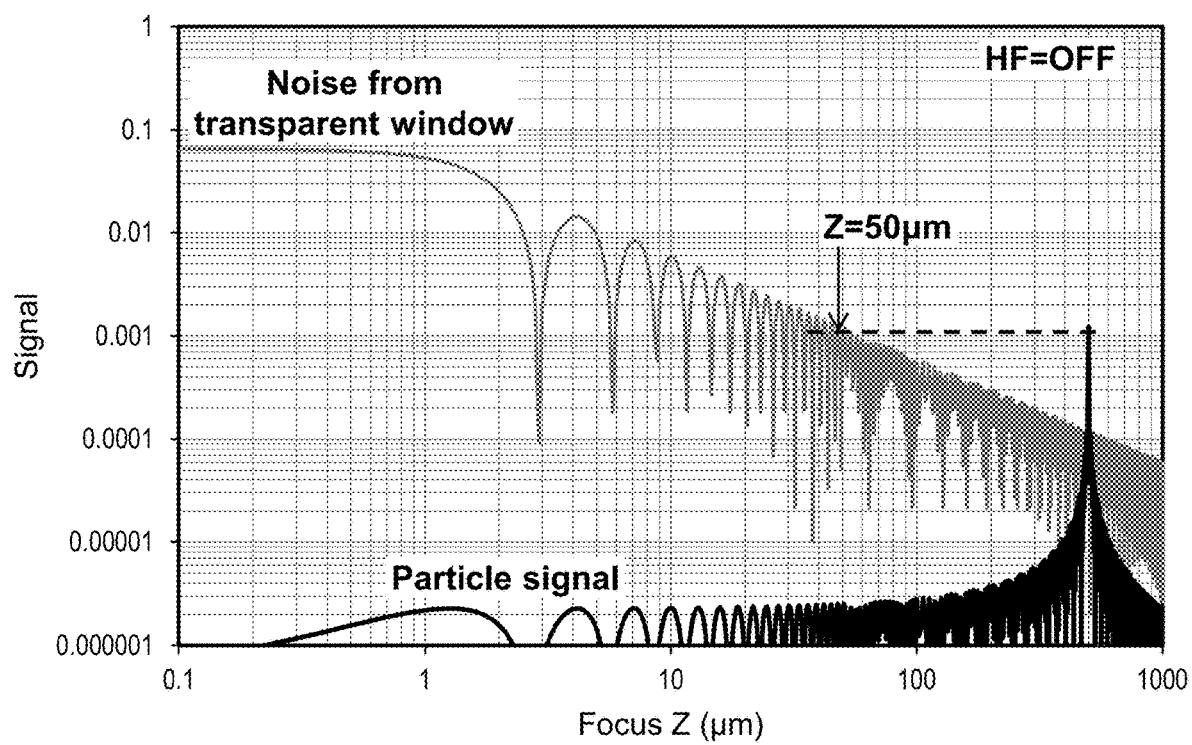
FIG. 10 is a calculation result showing a relationship between a focal position Z in the sample and a detection signal.

FIG. 10 is a calculation result showing a relationship between a focal position Z in the sample and a detection signal. Here, assuming that a coherence length of laser light is sufficiently large, a detection signal obtained from the target particle and noise obtained from a boundary between a transparent window and a solvent were calculated using Formula 8 and Formula 9. In FIG. 10, Z=0 is a boundary position between the transparent window and the solvent. Here, a refractive index of the solvent was 1.333, a refractive index of the particle was 1.400, a size thereof was 0.1 µm, and a position thereof was Z=500 µm. As seen in FIG. 10, a signal obtained from the boundary between the transparent window and the solvent is attenuated as Z increases, and when the position of the target particle is 500 µm, the detection signal from the particle is about 10 times larger than the noise from the boundary. As shown in FIG. 10, a condition for magnitudes of both to be the same is Z> about 50 µm. It can be seen from the result that, in the size distribution measurement of the invention, the focal position of the laser light in the sample is preferably at least 50 µm away from the transparent window.

Figure 11:
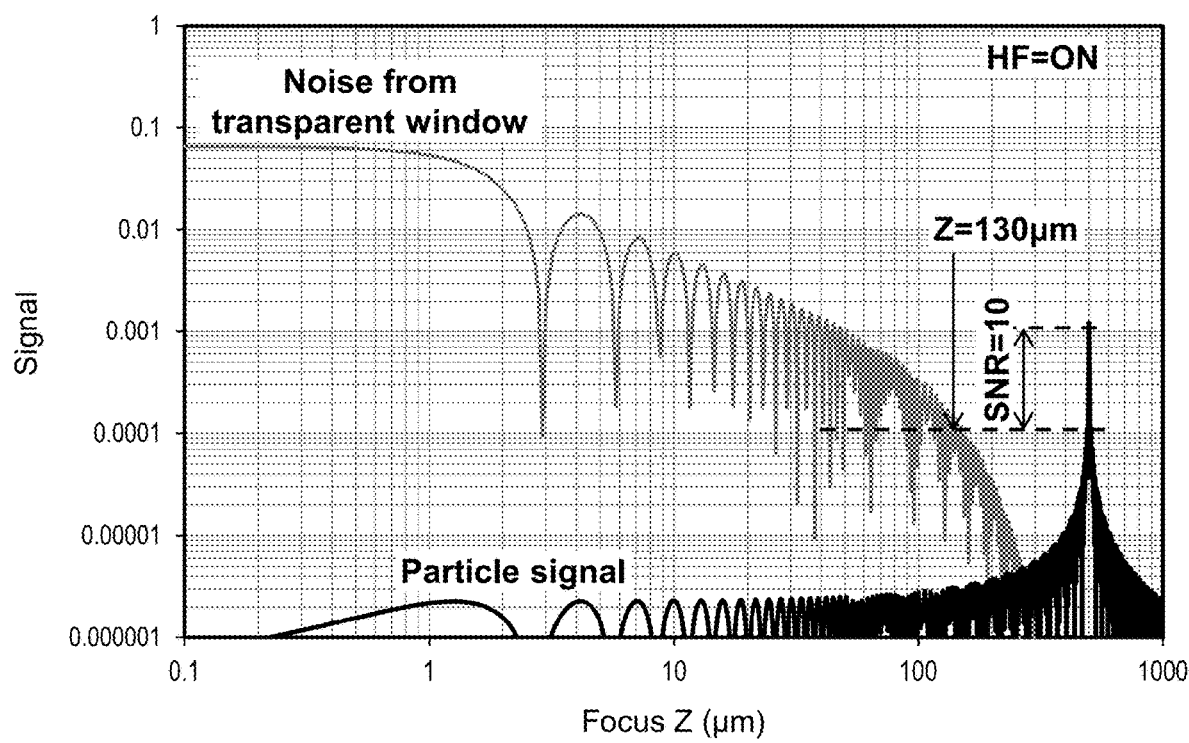
FIG. 11 is a calculation result showing a relationship between the focal position Z in the sample and a detection signal when a coherence length L of a semiconductor laser of a light source is set to 210 µm, which is obtained by using a radio frequency superimposition technique described in PTL 3.

FIG. 11 is a calculation result showing a relationship between the focal position Z in the sample and the detection signal when a coherence length L of the semiconductor laser of the light source is set to 210 µm, which is obtained by using a radio frequency superimposition technique described in PTL 3. Through experimental studies by the inventors, it has been found that when a semiconductor laser having a wavelength of 785 nm is used as the light source and a microscope lens having a numerical aperture of 0.45 is used as the objective lens, a frequency of radio frequency superimposition is set to about 300 MHz, and the coherence length is set to about 210 µm, which are conditions for radio frequency superimposition suitable for the invention from the viewpoint of laser noise, the viewpoint of noise from the boundary between the transparent window and the solvent, and the like. The calculation result is based on this.

As seen in FIG. 11, when a position of the target particle is 500 µm, the detection signal from the particle becomes about 100 times larger than the noise from the boundary by controlling the coherence length of the semiconductor laser serving as the light source by the radio frequency superimposition, and the influence of the noise is improved to about 1/10 due to the effect of the radio frequency superimposition. From FIG. 11, in order to perform the measurement with an S/N ratio of 10 or more by using the radio frequency superimposition, the focal position in the sample may be separated from the boundary of the transparent window by 130 µm or more. Generally, it can be considered possible to perform the measurement when the S/N ratio is about 3, and thus it can be said that the effects of the present embodiment can be obtained by measuring the sample at a distance of 100 µm or more from the boundary of the transparent window.

Regarding the coherence length control using the radio frequency superimposition, a suitable condition varies depending on a type of circuit to be used, an impedance matching condition, and the like. In consideration of the noise influence on the measurement according to Formula 9 while observing a temporal change in light emission power and spread of an oscillation wavelength from the viewpoint of the laser noise, the technique of the present embodiment can also be applied to other optical systems by setting the S/N ratio of the detection signal to a maximum for the target particle. This is easy for a general engineer in the relevant technical field.

Similarly, reflected light from a boundary between an upper end of a liquid level of the sample and the air also affects the measurement as noise. As seen in FIG. 11, the influence of noise can be sufficiently reduced by setting the measurement focal position to be away from the transparent window by about 500 µm, and thus the upper end of the liquid level of the sample is required to be 1 mm or more, which is twice 500 μm, from the boundary of the transparent window, in order to satisfactorily implement the effects of the present embodiment.

Next, a method for measuring the refractive index of the target particle will be described. After measuring the refractive index of the solvent in advance according to the present embodiment, the focal position of the laser light is moved into the sample according to Formula 5 to Formula 7 to measure the detection signal from the target particle, whereby the detection signal corresponding to the refractive index of each of the solvent and the target particle can be measured. When the size of the target particle is known like a polystyrene standard particle, the refractive index $n_p$ of the target particle can be calculated using the obtained detection signal and Formula 8. On the other hand, in the case of an object having an unknown size, such as a protein aggregate formed under a specific condition, a medium having a known refractive index, such as an aqueous sucrose solution shown in FIG. 8, may be used. When two average values of detection signals corresponding to the refractive index and size distribution of the solvent are obtained by measuring samples diluted with aqueous sucrose solutions of at least two concentrations (since there is a size distribution, it is better to use the average value), a quantity σ related to the size distribution and the refractive index $n_p$ of the target particle can be combined as two unknown quantities using Formula 8, thereby calculating both.

Embodiment 3: Sample Container

According to Embodiments 1 and 2, in order to measure the particle size distribution with high accuracy, a sample container including a transparent window which is a part of a measurement optical system needs to satisfy a predetermined specification. As described above, one of the conditions is that a height of a liquid level is 1 mm or more. In Embodiment 3 of the invention, a specific example of the sample container that satisfies the specification will be described. A measurement method is the same as that in Embodiments 1 and 2.

Figure 12:
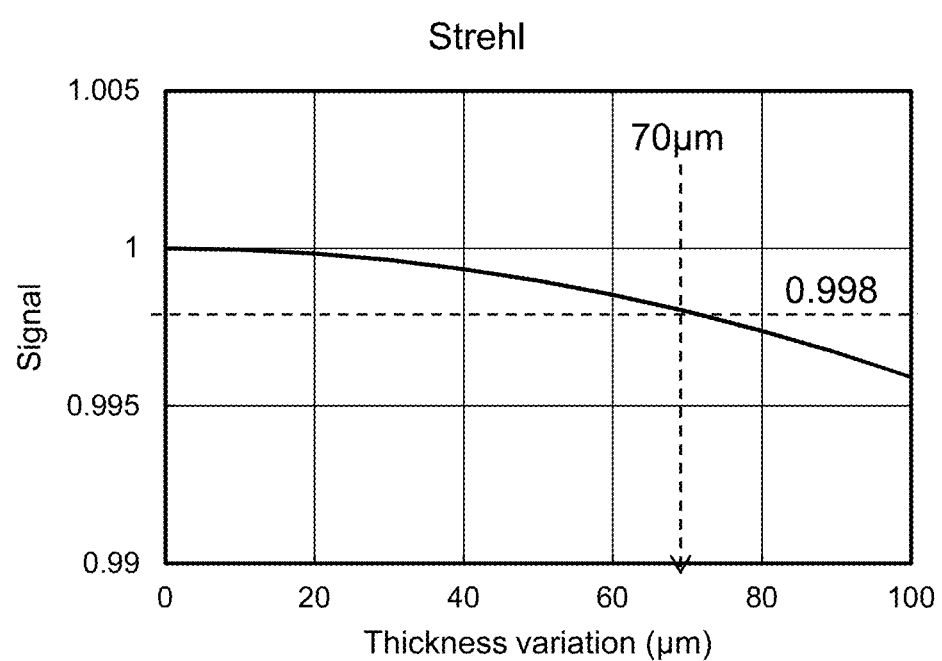
FIG. 12 is a calculation result showing a specification of thickness variation of the transparent window for implementing a measurement of the refractive index of the solvent with high accuracy according to the invention.

FIG. 12 is a calculation result showing a specification of thickness variation of the transparent window for implementing a measurement of a refractive index of a solvent with high accuracy according to the invention. As is well known, when a thickness of the transparent window deviates from a predetermined value, a spherical aberration occurs optically. The influence on the detection signal shown in Formula 1 and Formula 2 can be treated as a decrease in Strehl intensity based on a wavefront aberration. FIG. 12 is a calculation result showing a state of a decrease in detection signal (Strehl intensity) due to a deviation in thickness of the transparent window. Here, the result is shown when a semiconductor laser having a wavelength of 785 nm is used as a light source, a microscope lens having a numerical aperture of 0.45 is used as an objective lens, and borosilicate glass (measured refractive index value=1.520) having a thickness of 175 μm is used as the transparent window. As seen in FIG. 12, in order to reduce an amount of decrease in detection signal to 0.2% or less, it is required that the thickness variation of the transparent window (a thickness difference between a thickest portion and a thinnest portion) is 70 μm or less.

As described in Embodiment 1, in order to measure the refractive index and the particle size distribution of the solvent, it is preferable to convert reflected light into a detection signal and acquire the detection signal while moving the sample container in a Z direction. In principle, the same applies to a case where the measurement is performed while a position of the sample container is fixed and an entire optical system is moved, but compared with the sample container, a weight and volume of the entire optical system are very large, and thus it is not preferable from the viewpoint of power consumption and miniaturization of the device. As described above, when the sample container is moved in the Z direction by a motor-driven stage, vibration of the liquid level in the sample due to an influence of acceleration and deceleration is unavoidable. In order to make liquid level vibration sufficiently small with respect to an amount of Brownian motion, it is required to increase viscous resistance by forming a narrowed portion or the like on a wall surface of the container.

Figure 13:
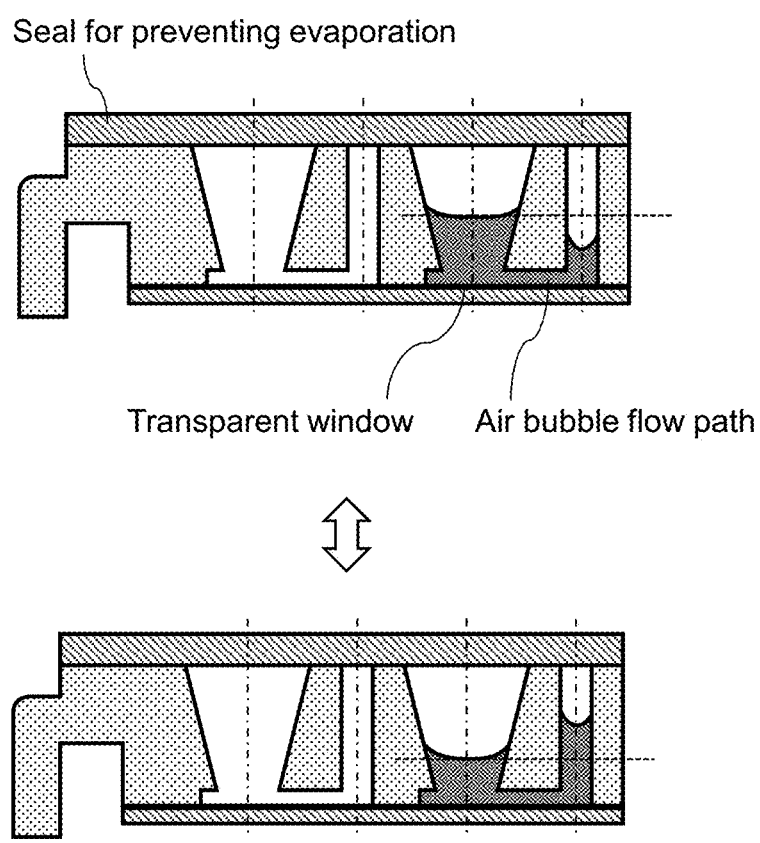
FIG. 13 is a schematic diagram showing a cross-sectional structure of a sample container described in PTL 2.

FIG. 13 is a schematic diagram showing a cross-sectional structure of a sample container described in PTL 2. Here, a state is schematically shown in which a liquid level vibrates due to the influence of movement of the sample container in the Z direction by the motor-driven stage as described above. As seen in FIG. 13, the sample container described in PTL 2 has a structure in which two regions are connected to each other such that air bubbles can escape through an air bubble flow path in order to prevent the air bubbles from entering a measurement portion. Accordingly, as a result of the movement in the Z direction, a mode in which liquid level heights in the two regions vibrate vertically is likely to occur. This is likely to be larger than the Brownian motion of the particle during the measurement, leading to a decrease in measurement accuracy.

Figure 14A:
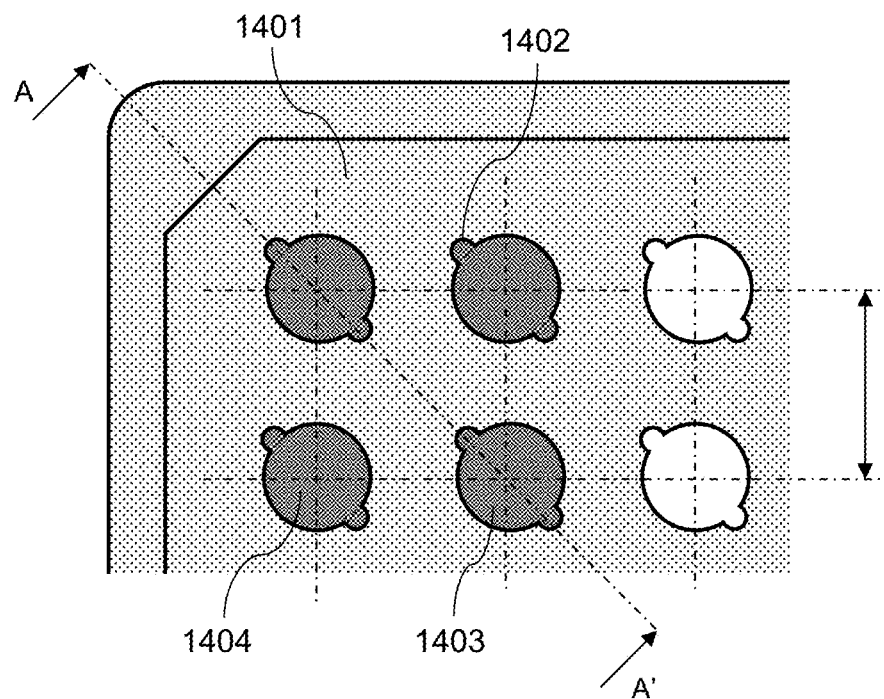
FIG. 14A shows a plan view of a sample container suitable for the invention.

FIG. 14A shows a plan view of a sample container suitable for the invention. In FIG. 14A, a reference numeral 1401 denotes a container, a reference numeral 1402 denotes a narrowed portion formed in an outer peripheral portion of a well, a reference numeral 1403 denotes a sample injected into the well, and a reference numeral 1404 denotes the well. As seen in FIG. 14A, in the present embodiment, the wells 1404 into which samples are injected are integrally formed and arranged in an array. A feature is that the narrowed portion 1402 is formed on an outer periphery of the well 1404. The narrowed portion 1402 is formed to protrude from a side wall of the well 1404 toward an outside of the well 1404. A cross-sectional area of the narrowed portion 1402 on a plane in FIG. 14A is smaller than a cross-sectional area of the well 1404.

Figure 14B:
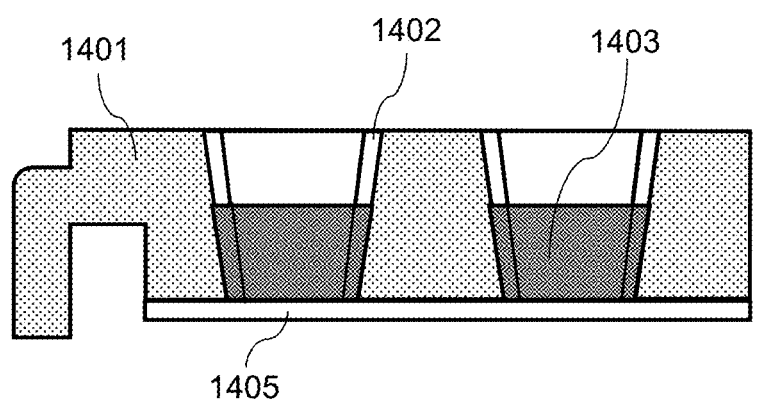
FIG. 14B is a cross-sectional view taken along a line AA' in FIG. 14A.

FIG. 14B is a cross-sectional view taken along a line AA' in FIG. 14A. A reference numeral 1405 denotes a transparent window. In order to reduce the vibration of the liquid level due to the movement of the container in the Z direction, the container 1401 does not use the air bubble flow path as in PTL 2, and includes the narrowed portion 1402 instead. The narrowed portion 1402 has a function of preventing the influence on the measurement by trapping air bubbles in the outer peripheral portion of the well 1404 instead of allowing the air bubbles to escape. Further, by forming the narrowed portion 1402, flow resistance between the liquid and the wall surface is effectively increased by utilizing capillary action, thereby reducing the vibration of the liquid level.

The container 1401 of the present embodiment can solve the problem of the liquid level vibration described above and implement a stable particle size distribution measurement. In order to reduce an amount of valuable biopharmaceutical sample to be used, a diameter of the well 1404 was set to 4.0 mm or less such that a liquid level height was 1 mm or more for a 20 μL sample. As a material of the transparent window 1405, borosilicate glass (measured refractive index=1.520) having a thickness of 175 μm was used. Thickness accuracy was controlled to within ±15 μm to satisfy the above specification (variation≤70 µm). An outer shape of the container 1401 is formed by molding a black polypropylene resin under control such that the transparent window 1405 is not inclined.

Figures 15A, 15B:
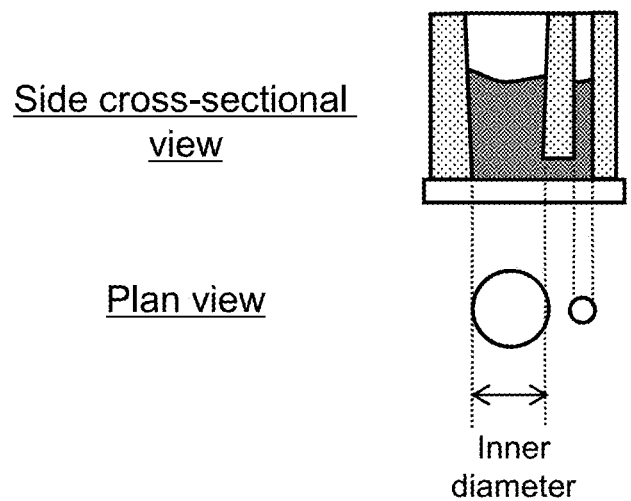
FIG. 15A shows an experimental result showing a ratio of measurements normally performed using the sample container described in PTL 2 without an influence of air bubbles occurring in a measurement region during sample dispensing.
FIG. 15B shows an experimental result showing a ratio of the measurements normally performed using the sample container described in PTL 2 without the influence of air bubbles occurring in the measurement region during the sample dispensing.

FIGS. 15A and 15B show an experimental result showing a ratio of measurements normally performed using the sample container described in PTL 2 without an influence of air bubbles occurring in a measurement region during sample dispensing. FIG. 15A is a cross-sectional structure of the container. Here, containers in which an inner diameter of a well is changed in a range of 2 mm to 3 mm as a range for a condition where a liquid level height is 1 mm or more for a sample amount of 20 µL were prepared according to the above specification. FIG. 15B is an experimental result in which ratios at which the size distribution measurement can be normally performed by performing a dispensing test 50 times are summarized in a table. As shown in FIG. 15B, when the inner diameter of the well is 3 mm, the size distribution measurement can be performed without occurrence of air bubbles. However, a measurement waiting time of 1 minute is required for the influence of liquid level vibration to be smaller than Brownian motion. This is found to be longer than a size distribution measurement time of 20 seconds.

Figures 16A, 16B:
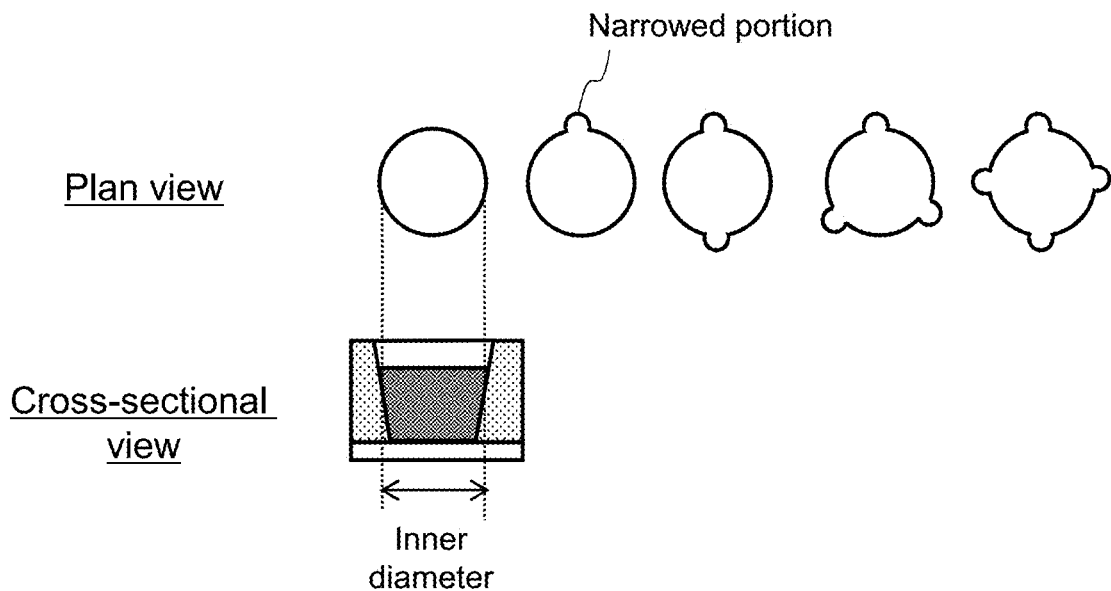
FIG. 16A is an experimental result showing a ratio of measurements normally performed using a sample container in Embodiment 3 without the influence of air bubbles occurring in the measurement region during the sample dispensing.
FIG. 16B is an experimental result showing a ratio of the measurements normally performed using the sample container in Embodiment 3 without the influence of air bubbles occurring in the measurement region during the sample dispensing.

FIGS. 16A and 16B show an experimental result showing a ratio of measurements normally performed using the sample container in the present embodiment without the influence of air bubbles occurring in the measurement region during the sample dispensing. As seen in FIG. 16A, here, containers in which the number of formed narrowed portions is changed in a range of 0 to 4 and an inner diameter of a well is changed in a range of 2 mm to 4 mm were prepared. FIG. 16B is an experimental result in which ratios at which the size distribution measurement can be normally performed by performing a dispensing test 50 times are summarized in a table. As seen in FIG. 16B, when the number of narrowed portions is zero, there is no condition where a total number of normal measurements can be implemented. On the other hand, in a case where the narrowed portion is formed as in the case of the container according to the present embodiment, there is a condition where a total number of normal measurements can be implemented when the number of narrowed portions is two or more or one and the inner diameter of the well is in a range of 3.5 mm to 4.0 mm. At this time, a measurement waiting time for the influence of liquid level vibration to be smaller than Brownian motion is about 5 seconds.

As described above, by using the sample container of the present embodiment, a bubble effect prevention performance equivalent to that of the container described in PTL 1 can be obtained, and the waiting time due to the movement of the sample container in the Z direction can be reduced, and the user convenience of completing the measurement in a short time can be improved.

Figure 17A:
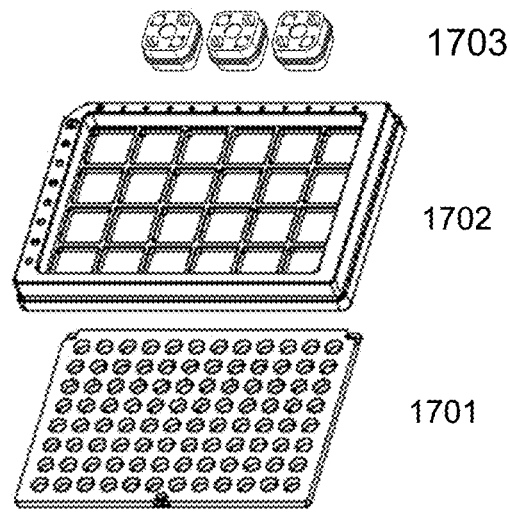
FIG. 17A is a diagram showing configurations of a sample container, a frame, and a base plate in Embodiment 3.

FIG. 17A is a diagram showing configurations of the sample container, a frame, and a base plate in the present embodiment. In FIG. 17A, a reference numeral 1701 denotes the base plate, a reference numeral 1702 denotes the frame, and a reference numeral 1703 denotes the sample container. The sample container 1703 is positioned and set on the base plate 1701 along the frame 1702. At this time, a transparent window, which is a bottom surface of the sample container, and the base plate were in contact with each other. As a material of the base plate 1701, it is desirable to use a metal material having a high thermal conductivity. Here, a graphite-based aluminum composite material ACM-io having a high thermal conductivity and excellent processing accuracy was used. With such a structure, the sample container can be made disposable after each measurement, and the convenience of the user can be improved by avoiding influence of adhering materials on container cleaning and measurement.

In the present embodiment, in consideration of a handling property of the user, a case where a sample container includes a set of four wells is described, and the number of wells provided in the sample container is any. For example, a container including 32 wells as one set can be prepared, and the number of sets can be appropriately selected in consideration of the cost, yield, and the like of the container.

Figure 17B:
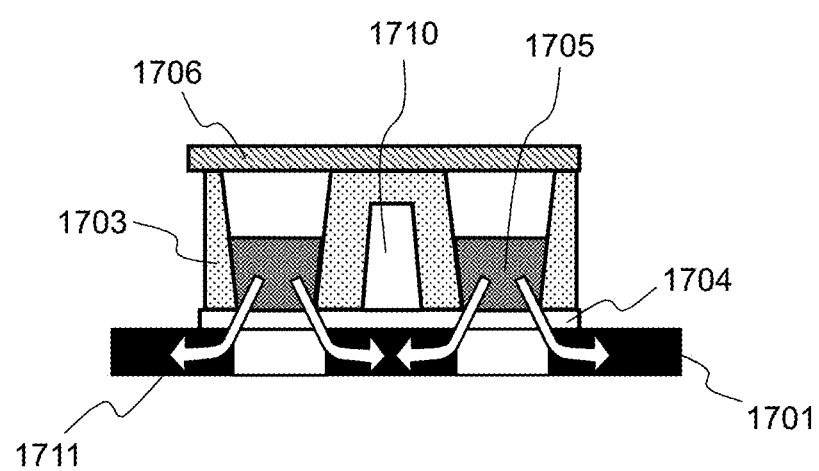
FIG. 17B is a schematic diagram showing a relationship between the container and the base plate in Embodiment 3.

FIG. 17B is a schematic diagram showing a relationship between the container and the base plate in the present embodiment. In FIG. 17B, the reference numeral 1701 denotes the base plate, the reference numeral 1703 denotes the sample container, a reference numeral 1704 denotes a transparent window, a reference numeral 1705 denotes a sample, a reference numeral 1706 denotes a seal for preventing evaporation of the sample, a reference numeral 1710 denotes a gap for improving shape accuracy of the container by injection molding, and a reference numeral 1711 denotes a heat flow from the sample to the base plate for temperature stabilization.

The present structure allows the transparent window 1704 to come into direct contact with the base plate 1701. The base plate 1701 is provided with a hole corresponding to the transparent window 1704, and a diameter thereof is larger than a diameter of the well. In a particle size measurement method of the invention, when there is a difference between a sample temperature and a measurement device temperature, a flow of particles due to convection is generated, and measurement accuracy decreases. In the present embodiment, the transparent window 1704 is made of a glass material having a high thermal conductivity with respect to a plastic material, and further the transparent window 1704 is brought into contact with the base plate 1701 made of a metal and having a high thermal conductivity. With such a configuration, the sample temperature can be made the same as the temperature in the device in a short time, and the waiting time for temperature stabilization can be shortened to improve the convenience for the user. The waiting time for temperature stabilization experimentally confirmed by the inventors could be shortened from 30 minutes to 10 minutes as compared with the sample container described in PTL 2. In the present embodiment, measurements of 96 samples can be performed continuously in one operation. A time required to complete the measurement of 96 samples was about 4.8 hours under the condition where the above standard measurement was repeated 10 times for each sample.

As described in Embodiment 1, in the invention, the refractive index of the solvent is measured using the transparent window of the sample container as a part of the optical system. In the embodiments described above, a method was disclosed in which a reference signal is stored in advance at the time of shipment of the device. On the other hand, it is known that quantum efficiency of a semiconductor laser serving as a light source is reduced more when the semiconductor laser is used for a long period of time, and it is also known that a light emission wavelength distribution changes more with temperature. Further, dust or the like may adhere to a surface of the objective lens, thereby decreasing transmittance and reducing a magnitude of a detection signal. In such a case, when a signal level stored in advance at the time of shipment of the device is used as a reference value, a measurement error of the refractive index becomes large.

Figure 18A:
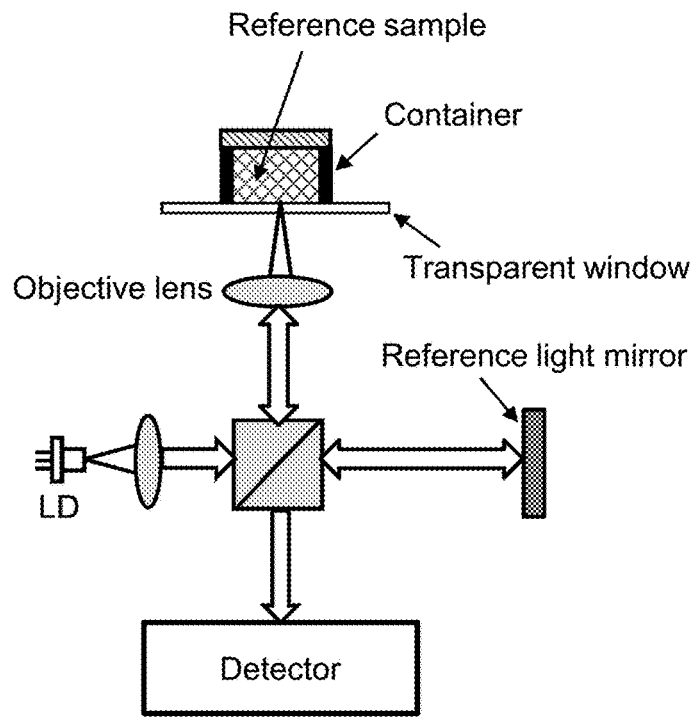
FIG. 18A is a schematic diagram showing a configuration of a container suitable as a reference for measuring a refractive index of a solvent.

FIG. 18A is a schematic diagram showing a configuration of a container suitable as a reference for measuring the refractive index of the solvent. FIG. 18A shows a method for measuring a reference signal using a sample container sealed with pure water for clean rooms, or an ultraviolet curable resin or a thermosetting resin having a known refractive index (a reference sample) instead of a sample. By positioning a focus of laser light at an interface between the transparent window and pure water or the ultraviolet curable resin or thermosetting resin, adjusting a position of a reference light mirror such that optical path lengths become equal, and then acquiring a reference signal, a necessary reference signal can be obtained in Formula 2 to Formula 4.

Figure 18B:
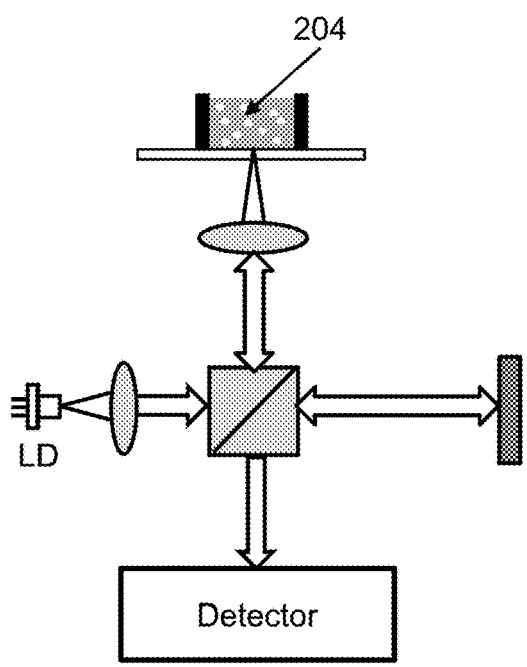
FIG. 18B is a schematic diagram showing a state of a measurement of a solvent in a target sample as in Embodiment 1.

FIG. 18B is a schematic diagram showing a state of a measurement of a solvent in a target sample as in Embodiment 1. By using a sample container sealed with a substance having a known refractive index as in the present embodiment, a change in quantum efficiency of the semiconductor laser described above and an influence of dust adhered to the objective lens or the like can be eliminated as common terms using Formula 4, and the measurement accuracy of the refractive index of the solvent with high accuracy can be maintained according to the invention. Such a container may be installed on the above-described frame as needed by the user, or may be fixed to a specific portion in the device in advance. When pure water is used as the sealing material, there is an advantage that the user can easily prepare the sealing material as necessary. When the UV curable resin or thermosetting resin is sealed, there is an advantage that the UV curable resin or thermosetting resin is easily handled without being affected by a liquid amount, evaporation, or the like, and convenience for the user is improved.

Embodiment 4: Particle Measurement Device

Figure 19:
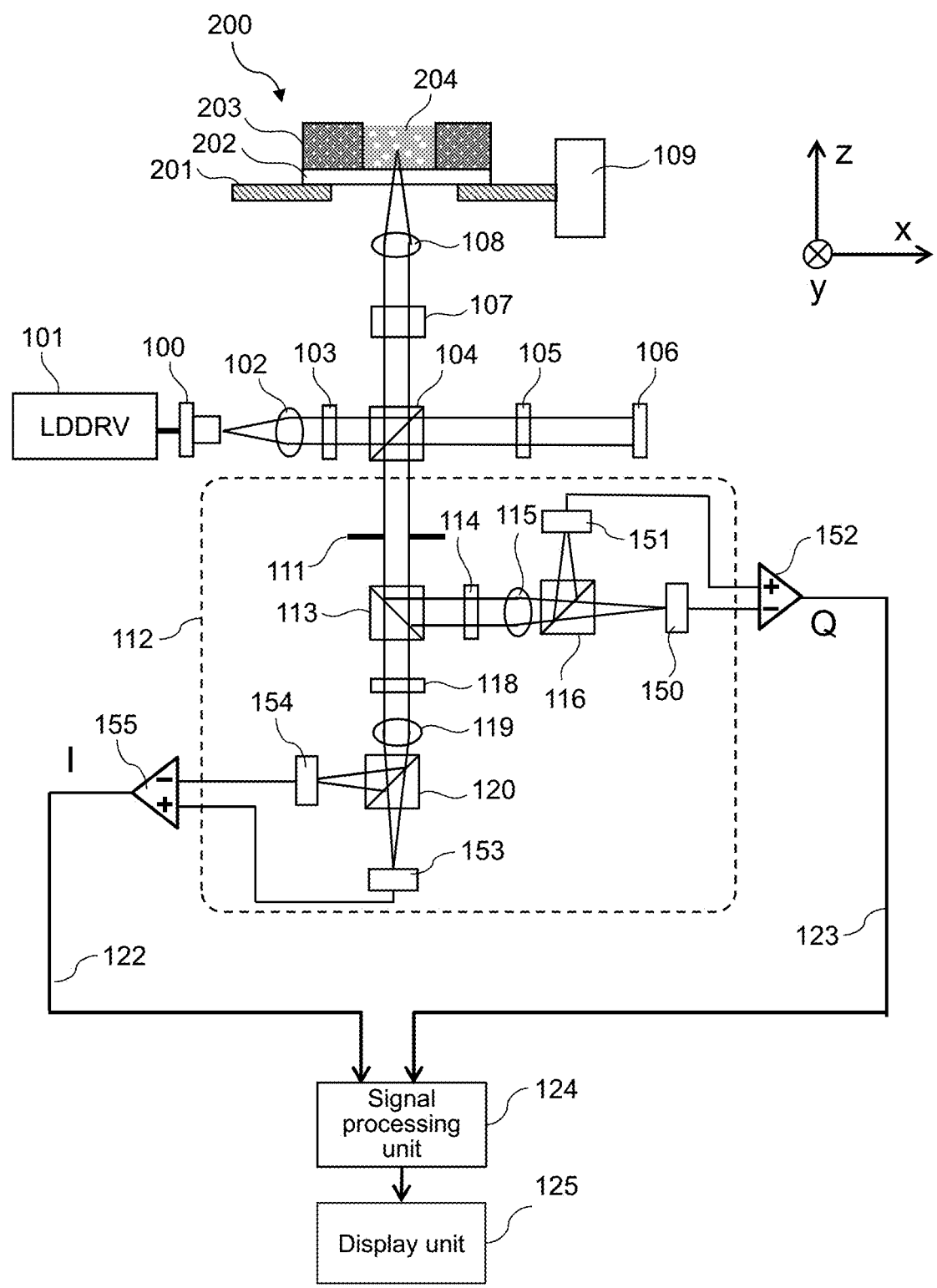
FIG. 19 is an example of a configuration diagram of a particle measurement device according to Embodiment 4.

FIG. 19 shows an example of a configuration diagram of a particle measurement device according to Embodiment 4 of the invention. Laser light emitted from a light source 100 whose light emission state is controlled by a laser driver 101 that controls radio frequency superimposition and emission power is converted into parallel light by a collimator lens 102, a polarization direction is adjusted by a $\lambda/2$ plate 103 whose optical axis is set to about 22.5 degrees with respect to a horizontal direction, and then the laser light is separated into signal light and reference light by a polarized beam splitter 104.

After the reference light is converted into a circular polarized state by a $\lambda/4$ plate 105, the reference light is reflected by a reference light mirror 106, reflected light is brought into a polarized state in which polarized light is rotated by 90 degrees from an outward path by the $\lambda/4$ plate 105, and the polarized light is reflected by the polarized beam splitter 104. A traveling direction of the signal light is deflected by a composite deflection element 107 in an XY direction, and then the signal light is converted into a circularly polarized state by an action of a built-in $\lambda/4$ plate, and is focused in the sample 204 by the objective lens 108. A drive mechanism 109 that moves the sample in a Z axis direction has a function of scanning a focal position of the signal light along a Z axis direction (an optical axis direction). A component of the signal light reflected from the sample 204 is deflected in a direction same as an outward path by the composite deflection element 107 in the XY direction, the signal light becomes circular due to the action of the built-in $\lambda/4$ plate and is brought into a polarized state in which polarized light is rotated by 90 degrees from an outward path, and polarized light is transmitted through the polarized beam splitter 104. Here, a sample container 200 holds the sample 204 in the well and guides the signal light into the sample through the transparent window 202. The container 203 is a resin member that forms the well of the sample container. The base plate 201 is in contact with the transparent window 202 to mechanically hold the sample container 200 and is responsible for stabilizing the temperature of the sample.

The signal light and the reference light are multiplexed by the polarized beam splitter 104, guided to a detection optical system 112, and split into transmitted light and reflected light by a half beam splitter 113 via a pinhole 111.

The reflected light is transmitted through a $\lambda/4$ plate 114 whose optical axis is set to about 45 degrees with respect to the horizontal direction, then the transmitted light is converged by a converging lens 115 and is split into two by a polarized beam splitter 116, the split light beams are converted into electric signals by respective optical detectors 150 and 151, and the electric signals are differentially amplified by a current differential amplifier 152 to become a detection signal 123.

The transmitted light is transmitted through a $\lambda/2$ plate 118 whose optical axis is set to about 22.5 degrees with respect to the horizontal direction, then the transmitted light is converged by a converging lens 119 and is split into two by a polarized beam splitter 120, the split light beams are converted into electric signals by respective optical detectors 153 and 154, and the electric signals are differentially amplified by a current differential amplifier 155 to become a detection signal 122.

The detection optical system 112 shown here constitutes a homodyne phase diversity method, and the detection signals 122 and 123 are a real part and an imaginary part of the detection signals shown in (Formula 8) and (Formula 9), respectively. A magnitude of the detection signal is processed by a signal processing unit 124 as an absolute value calculated from these. A display unit 125 displays the calculation result by the signal processing unit 124 and presents the calculation result to a user. The signal processing unit 124 calculates a refractive index of a solvent, a refractive index of a particle, a particle size, and the like by performing the methods described in the above embodiments (for example, flowcharts in FIGS. 6 and 7). The signal processing unit 124 controls each unit provided on the particle measurement device.

Using the present device to perform a continuous automatic measurement on an array of a plurality of sample containers shown in FIG. 17A can be more easily implemented by adding a sample moving function not only in the Z direction but also in the X and Y directions as a function of the drive mechanism 109.

Embodiment 5: Method for Moving Focal Position in Size Distribution Measurement

As shown in Embodiment 1, in order to measure particle size distribution according to the invention, it is necessary to acquire the detection signal while moving the focal position within the sample in the Z direction. At this time, it is preferable to acquire the detection signal while moving the sample container in the Z direction in terms of keeping the optical path length condition of the optical system constant. On the other hand, even when the measurement is performed while the position of the sample container is fixed and the entire optical system is moved, the effect of keeping the optical path length condition of the optical system constant is the same, but the weight and volume of the entire optical system are very large compared to the sample container, and thus it is not preferable from the viewpoint of power consumption and miniaturization of the device. However, when power variation or the like of the light transmitted through the objective lens is within a certain standard, the particle size distribution can be measured by moving only the objective lens, not the entire optical system, toward the sample. In Embodiment 5 of the invention, a specific example thereof will be described. The present embodiment is the same as the above embodiments except that the objective lens is moved instead of the sample container.

Figure 20A:
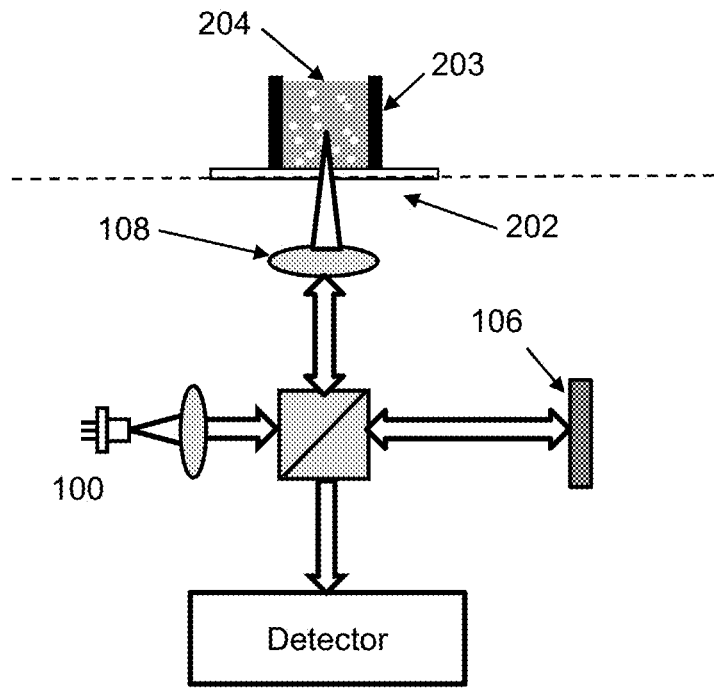
FIG. 20A schematically shows a particle size distribution measurement method of the invention in which a detection signal is acquired while moving a sample container in a Z direction.
Figure 20B:
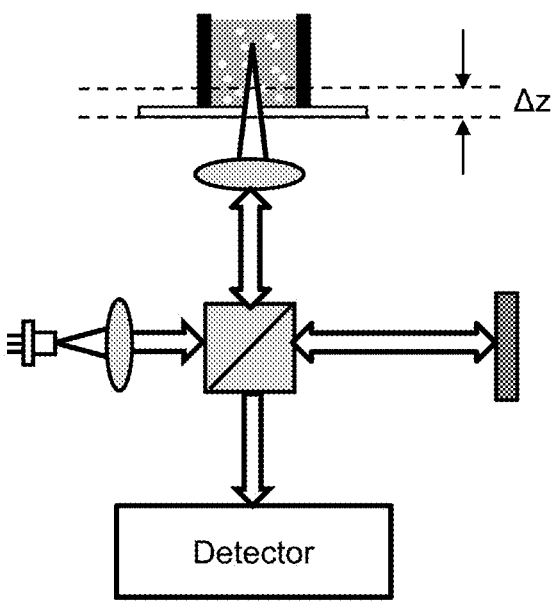
FIG. 20B schematically shows the particle size distribution measurement method of the invention in which a detection signal is acquired while moving the sample container in the Z direction.

FIGS. 20A and 20B schematically show a particle size distribution measurement method of the invention in which a detection signal is acquired while moving the sample container in the Z direction. FIG. 20A is a schematic diagram showing a case where a focal position is at a start point. FIG. 20B is a schematic diagram showing a case where the focal position is at an end point. In FIG. 20B, $\Delta z$ indicates a position difference between the two in the sample container. As described above, it is known that $\Delta z$ is preferably 50 μm to 100 μm. A movement of the sample container is controlled by a Z stage (not shown).

Figure 21A:
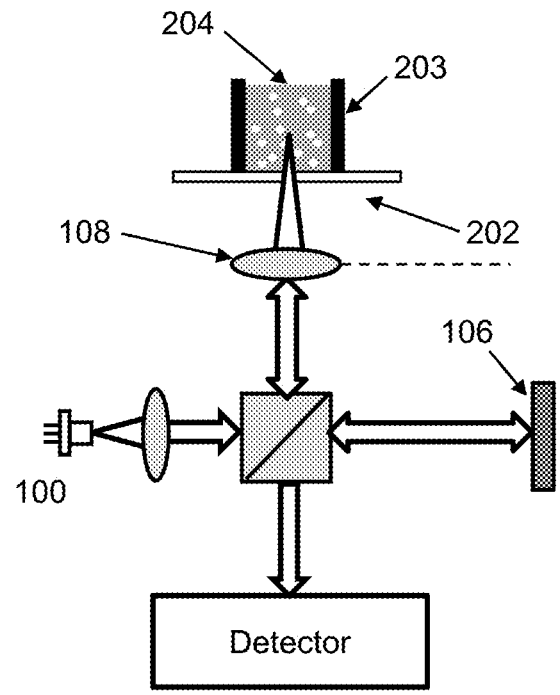
FIG. 21A schematically shows a particle size distribution measurement method of the invention in which a detection signal is acquired while moving an objective lens in the Z direction.
Figure 21B:
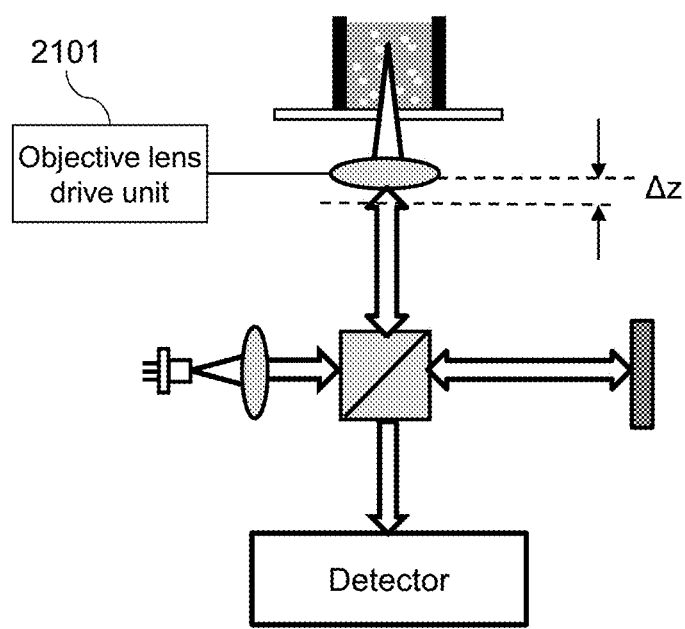
FIG. 21B schematically shows the particle size distribution measurement method of the invention in which a detection signal is acquired while moving the objective lens in the Z direction.

FIGS. 21A and 21B schematically show a particle size distribution measurement method of the invention in which a detection signal is acquired while moving an objective lens in the Z direction. FIG. 21A is a schematic diagram showing a case where a focal position is at a start point. FIG. 21B is a schematic diagram showing a case where the focal position is at an end point. In FIG. 21B, $\Delta z$ indicates a position difference between the two in the objective lens. A movement of the objective lens is controlled by an objective lens drive unit 2101 (for example, a Z stage, corresponding to a "scanning unit" that scans the position of the objective lens). In the configuration of the present drawing, there is an advantage that vibration of a sample liquid level due to inertial force and vibration propagation from the stage is prevented since a position of the sample container does not move during the measurement. On the other hand, an addition of the Z stage for moving the objective lens makes the device configuration complicated. A movement amount of the objective lens during the size distribution measurement is about 50 μm to 100 μm, and thus when a beam diameter is about 5 mm, even in a method of scanning a focal position by a galvanometer mirror, it is easy for a general optical engineer to make the optical system such that the power variation of the light transmitted through the objective lens is sufficiently small. Since the weight of the objective lens is sufficiently small with respect to the entire optical system, the power consumption of the method is equivalent to that of the method of moving the sample container.

As described above, the method of the invention can be applied to either a method of moving a sample container or a method of moving an objective lens.

Embodiment 6: Sample Container

Figure 22A:
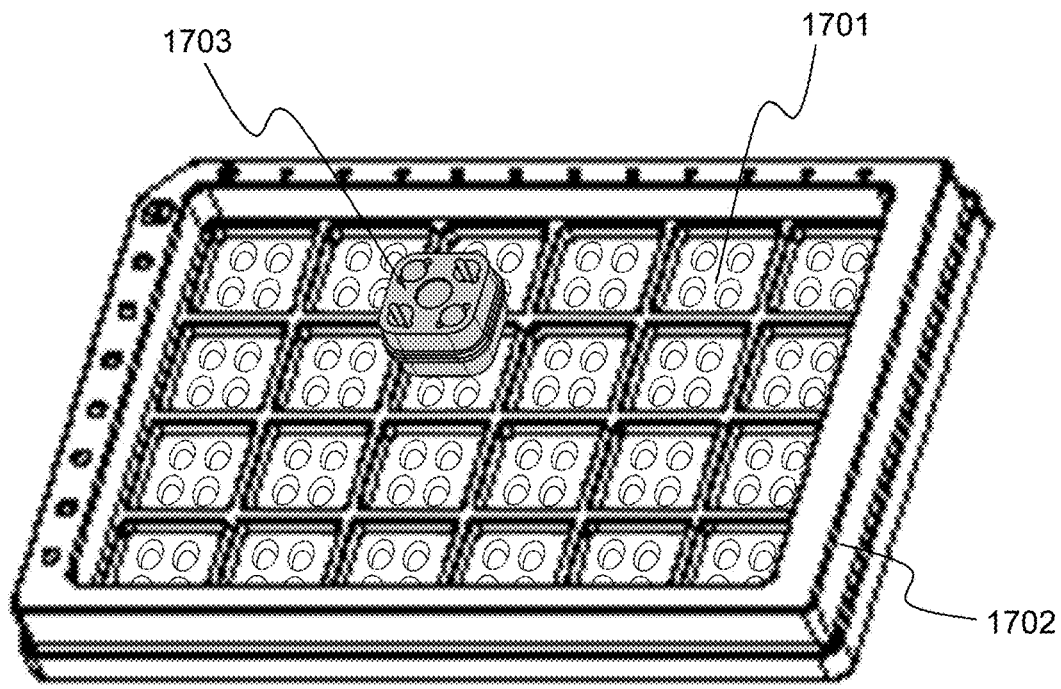
FIG. 22A schematically shows a case where the sample container of the invention is attached to and detached from the particle measurement device of the invention.

FIG. 22A is a schematic diagram showing a state in which a sample container according to Embodiment 6 of the invention is attached to and detached from the particle measurement device of the invention. In FIG. 22A, the reference numeral 1701 denotes a base plate, the reference numeral 1702 denotes a frame, and the reference numeral 1703 denotes a sample container. Here, the base plate 1701 and the frame 1702 are attached and fixed to the particle measurement device to form a sample holder. With this configuration, the sample container 1703 can be attached to and detached from the sample holder. A user can use disposable sample containers without having to clean wells into which samples are dispensed or manage foreign substances, allowing for quick and stable measurements. When all the present sample containers are attached to the sample holder, dimensions are the same as the 96-well standard (127.76 mm width×85.48 mm depth) of the microplate described above. At the same time, a pitch between wells is the same as that of the same standard (9 mm). This can provide user convenience such as common use of a storage.

Figure 22B:
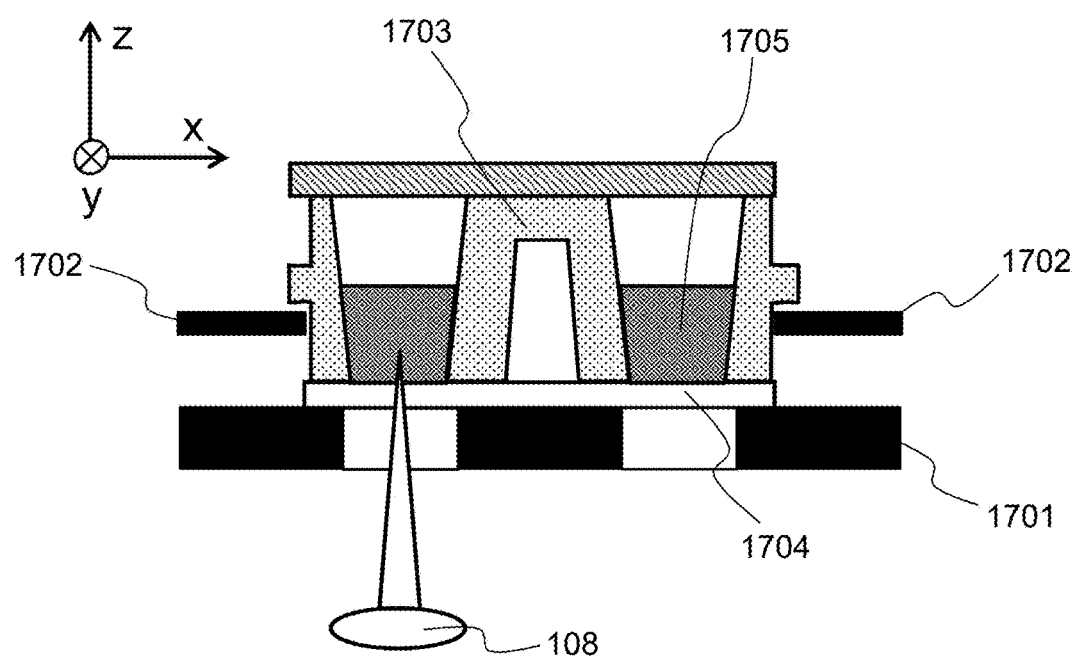
FIG. 22B schematically shows a cross-sectional view of the sample container of the invention attached to the particle measurement device.

FIG. 22B is a cross-sectional view showing a state in which the sample container of the invention is attached to the particle measurement device. In FIG. 22B, the reference numeral 1701 denotes a base plate, the reference numeral 1702 denotes a frame, the reference numeral 1703 denotes a sample container, the reference numeral 1704 denotes a transparent window, the reference numeral 1705 denotes a sample, and the reference numeral 108 denotes an objective lens. In the invention, the sample container needs to be irradiated with light emitted from the objective lens through the transparent window. For this purpose, the sample container needs to be positioned in a state in which the sample container is accommodated in a folder such that the well does not interfere with measurement. The invention is structurally devised to make this possible. As seen in FIG. 22B, positioning of the wells in an XY direction is implemented by dimensional accuracy of outer shapes of the frame 1702 and the sample container 1703. A gap between the wells is preferably about 30 μm to 300 μm. Positioning of the wells in a Z direction is implemented by bringing the transparent window 1704 into contact with the base plate 1701.

The sample container of the present embodiment includes four wells. As compared with a sample container including one well, the container can have a width of about 17.5 mm in the XY direction and a height of about 11 mm, making it easy to pick up by hand in terms of size, and the container can self-stand and not fall during dispensing, improving user workability. By setting the width of the container of the invention to be equal to or less than twice the well pitch of 9 mm (18 mm) in the 96-well standard of the microplate described above, 96 wells can be arranged without overlapping.

Regarding Modifications of Invention

The invention is not limited to the above-described embodiments and includes various modifications. For example, the embodiments described above have been described in detail to facilitate understanding of the invention, and the invention is not necessarily limited to those including all the configurations described above. Further, a part of a configuration according to a certain embodiment can be replaced with a configuration according to another embodiment, and a configuration according to another embodiment can be added to a configuration according to a certain embodiment. It is possible to add, delete, or replace a part of configurations of each embodiment with another configuration.

In the above embodiments, the member (for example, 202 or 1704) forming the transparent window is exemplified as one plate-shaped member disposed below the member (for example, 203 or 1703) forming the well, but a structure of the member forming the transparent window is not limited thereto. It is sufficient that at least a region that transmits light is formed between the well and the sample, thereby functioning as a transparent window. Further, the member forming the transparent window may be formed as a part of the sample container, or may be formed as a member forming the transparent window by being attached to the sample container.

REFERENCE SIGNS LIST

100: light source
101: laser driver
108: objective lens
109: drive mechanism
112: detection optical system
124: signal processing unit
200: sample container
201: base plate
202: transparent window
203: resin member for forming well

The invention claimed is:

1. A particle measurement device for measuring a size of a particle floating in a sample containing a solvent and the particle, the device comprising:
   a light source configured to emit light;
   an objective lens configured to irradiate the sample with the light;
   a scanning unit configured to scan at least one of a position of the sample and a position of the objective lens along an optical axis direction of the light;
   a detection unit configured to detect an intensity of the light reflected from the sample; and
   a calculation unit configured to calculate the size of the particle based on the intensity and a refractive index of the solvent, wherein
   the light source irradiates the sample in contact with a light transmitting window with the light through the light transmitting window,
   the calculation unit specifies a boundary position between the light transmitting window and the sample along the optical axis direction by specifying a peak of the intensity in a process of scanning the position of the sample or the position of the objective lens by the scanning unit, and
   the calculation unit calculates the refractive index of the solvent according to a relationship among
      a first intensity of the light reflected by emitting the light with the boundary position between the light transmitting window and the sample along the optical axis direction as a focus of the objective lens,
      a second intensity of the light reflected by emitting the light with a boundary position between the light transmitting window and a known sample having a known refractive index along the optical axis direction as a focus of the objective lens,
      the refractive index of the solvent,
      a refractive index of the known sample, and
      a refractive index of the light transmitting window.

2. The particle measurement device according to claim 1, wherein
   the scanning unit moves a focus of the light into the sample after the calculation unit acquires the refractive index of the solvent,
   the calculation unit acquires data in which a relationship among the refractive index of the solvent, the size of the particle, and the first intensity is described, and
   the calculation unit calculates the size of the particle by referring to the data using the refractive index of the solvent and the first intensity when the focus of the light is within the sample.

3. The particle measurement device according to claim 1, wherein
   the calculation unit calculates a candidate of the boundary position by repeating specifying the peak of the intensity in the process of scanning the position of the sample or the position of the objective lens by the scanning unit,
   the calculation unit calculates a difference between the candidate calculated in the repetition process and a previous value thereof, and
   the calculation unit employs, as the boundary position, the candidate at a time point when the difference becomes less than a threshold.

4. The particle measurement device according to claim 1, further comprising:
   a light splitting unit configured to split the light emitted from the light source into measurement light and reference light;
   a light irradiation unit configured to converge the measurement light and irradiate the sample with the measurement light;
   an optical path length adjustment unit configured to adjust an optical path length of the reference light;
   an interference optical system configured to generate interference light by combining signal light generated by the measurement light being reflected from the sample with the reference light; and
   a light detection unit configured to detect the interference light, wherein
   the calculation unit adjusts the optical path length by controlling the optical path length adjustment unit such that the interference light has a maximum intensity for each focal position of the light, and
   the calculation unit calculates the size of the particle using the optical path length at which the maximum intensity is obtained.

5. The particle measurement device according to claim 4, wherein
   when the scanning unit moves the position of the sample by dz toward the light irradiation unit or moves the position of the objective lens by dz toward the sample along the optical axis direction, the optical path length adjustment unit increases the optical path length of the reference light by dr, and $dr = \alpha(n^2 - 1)dz$, where n is the refractive index of the sample, and
   $\alpha$ is a constant from 0.8 to 1.2.

6. The particle measurement device according to claim 4, wherein
   the calculation unit calculates a refractive index of the particle using a signal value of the interference light detected by the light detection unit, the size of the particle, an electric field amplitude of the measurement light, an electric field amplitude of the reference light, the refractive index of the solvent, a coherence length of the light, and an optical path length difference between the signal light and the reference light.

7. The particle measurement device according to claim 4, wherein
   the calculation unit acquires, for each of the solvents having different refractive indices, a combination of a signal value of the interference light detected by the light detection unit, an electric field amplitude of the measurement light, an electric field amplitude of the reference light, the refractive index of the solvent, a coherence length of the light, and an optical path length difference between the signal light and the reference light, and the calculation unit calculates the size of the particle and a refractive index of the particle using each of the combinations.

8. The particle measurement device according to claim 1, further comprising:

a sample container, wherein the sample container includes a well for accommodating the sample, the sample container further includes a narrowed portion protruding from a side wall of the well toward an outside of the well, and a cross-sectional area of the narrowed portion on a plane perpendicular to a height direction of the sample container is smaller than a cross-sectional area of the well on the plane.

9. A particle measurement method for measuring a size of a particle floating in a sample containing a solvent and the particle, the method comprising:

a step of irradiating the sample in contact with a light transmitting window with light emitted from a light source through the light transmitting window by an objective lens;

a step of scanning at least one of a position of the sample and a position of the objective lens along an optical axis direction of the light;

a step of detecting an intensity of the light reflected from the sample; and a step of calculating the size of the particle based on the intensity and a refractive index of the solvent, wherein in the step of calculating the size of the particle, a boundary position between the light transmitting window and the sample along the optical axis direction is specified by specifying a peak of the intensity in a process of scanning the position of the sample or the position of the objective lens by the step of scanning, in the step of calculating the size of the particle, the refractive index of the solvent is calculated according to a relationship among a first intensity of the light reflected by emitting the light with the boundary position between the light transmitting window and the sample along the optical axis direction as a focus of the objective lens, a second intensity of the light reflected by emitting the light with a boundary position between the light transmitting window and a known sample having a known refractive index along the optical axis direction as a focus of the objective lens, the refractive index of the solvent, a refractive index of the known sample, and a refractive index of the light transmitting window.

10. The particle measurement method according to claim 9, wherein the sample is held in a sample container including a well for accommodating the sample, the sample container further includes a narrowed portion protruding from a side wall of the well toward an outside of the well, and a cross-sectional area of the narrowed portion on a plane perpendicular to a height direction of the sample container is smaller than a cross-sectional area of the well on the plane.

11. The particle measurement method according to claim 10, wherein an inner diameter of the well is in a range of 3.5 mm to 4.0 mm.

12. The particle measurement method according to claim 9, wherein the light transmitting window is formed by a member that is a part of a sample container configured to accommodate the sample or that is attachable to the sample container, and a difference between a maximum thickness and a minimum thickness of the light transmitting window is 70 μm or less.

13. The particle measurement method according to claim 9, wherein the sample is held in a sample container including a well for accommodating the sample, the sample container is provided to be in contact with a metal base plate via a frame with the light transmitting window formed thereon, the base plate includes a hole facing the light transmitting window, and an opening size of the hole is larger than an opening size of the light transmitting window.

14. The particle measurement method according to claim 9, further comprising:

measuring the refractive index of the solvent using a reference sample having a known refractive index and provided separately from the sample.

15. A sample container for holding a sample in a well formed therein, the sample container being provided in a size measurement device configured to measure a size of a particle floating in a solvent by irradiating the sample containing the solvent and the particle with light, and detachably attached to a sample holder formed of a frame and a metal base plate, the sample container comprising:

a shape feature for providing a positioning function of performing positioning in two directions perpendicular to an optical axis of the light by being inserted into the frame, and performing positioning in an optical axis direction of the light by coming into contact with the base plate;

a shape feature for providing a function of forming a light transmitting window capable of irradiating the sample with the light by a hole provided in the base plate and a transparent member disposed in a bottom portion of the sample container;

a shape feature for providing a function of reducing a sample consumption amount by reducing an amount of the sample to be used to about 20 μL by making an inner diameter of the well in a range of 3.5 mm to 4.0 mm;

a shape feature for providing a function of facilitating handling during dispensing or detaching by forming four or more wells;

a shape feature for providing a function of reducing an influence of an air bubble generated within the sample by setting the well to have two or more and four or less narrowed portions protruding from a side wall toward an outside, and setting a cross-sectional area of the narrowed portion in a plane perpendicular to the optical axis of the light to be smaller than a cross-sectional area of the well; and a shape feature for providing a function of enabling the size measurement device to measure a refractive index of the solvent by setting a difference between a maximum thickness and a minimum thickness of the transparent member to a range of 70 μm or less.

* * * * *